US011627445B2

(12) United States Patent
Zhang et al.

(10) Patent No.: US 11,627,445 B2
(45) Date of Patent: Apr. 11, 2023

(54) RESOURCE SELECTION METHOD IN VEHICLE TO EVERYTHING COMMUNICATION AND APPARATUS THEREFORE

(71) Applicant: Samsung Electronics Co., Ltd., Suwon-si (KR)

(72) Inventors: Shichang Zhang, Beijing (CN); Yingyang Li, Beijing (CN); Yi Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/444,458

(22) Filed: Aug. 4, 2021

(65) Prior Publication Data

US 2021/0368312 A1 Nov. 25, 2021

Related U.S. Application Data

(63) Continuation of application No. 16/490,408, filed as application No. PCT/KR2018/003478 on Mar. 23, 2018, now Pat. No. 11,102,631.

(30) Foreign Application Priority Data

Mar. 24, 2017 (CN) ......................... 201710182401.7
May 3, 2017 (CN) ......................... 201710304754.X
(Continued)

(51) Int. Cl.
*H04W 4/44* (2018.01)
*H04W 52/38* (2009.01)
(Continued)

(52) U.S. Cl.
CPC ........... *H04W 4/44* (2018.02); *H04W 52/383* (2013.01); *H04W 56/0005* (2013.01); *H04W 72/042* (2013.01); *H04W 84/005* (2013.01)

(58) Field of Classification Search
CPC . H04W 4/44; H04W 52/383; H04W 56/0005; H04W 72/042; H04W 84/005
(Continued)

(56) References Cited

U.S. PATENT DOCUMENTS 9,698,949 B2 7/2017 Lee
10,321,401 B2 6/2019 Li et al.
(Continued)

FOREIGN PATENT DOCUMENTS

CN 104936297 A 9/2015
CN 105338639 A 2/2016
(Continued)

OTHER PUBLICATIONS

Communication pursuant to Article 94(3) EPC dated Nov. 24, 2021, in connection with European Application No. 18772610.4, 6 pages.
(Continued)

*Primary Examiner* — Hai V Nguyen

(57) ABSTRACT

Embodiments of the present disclosure provide a resource selection or reselection method by a user equipment (UE) and the UE in Vehicle to vehicle/pedestrian/infrastructure/network (V2X) communication. The method comprises the steps of: detecting physical sidelink control channel (PSCCH) transmitted by other UE(s); selecting (a) single-subframe resource(s) from single-subframe resources which do not overlap with single-subframe resources reserved by the detected PSCCH; and transmitting physical sidelink shared channel (PSSCH) on the selected single-subframe resource(s).

12 Claims, 6 Drawing Sheets

(30) Foreign Application Priority Data

| Jun. 23, 2017 | (CN) | 201710486403.5 |
| Jun. 23, 2017 | (CN) | 201710488679.7 |
| Aug. 10, 2017 | (CN) | 201710682189.0 |
| Nov. 1, 2017 | (CN) | 201711059732.8 |
| Nov. 20, 2017 | (CN) | 201711160446.0 |
| Jan. 15, 2018 | (CN) | 201810036887.8 |

(51) Int. Cl.
 H04W 56/00 (2009.01)
 H04W 72/04 (2023.01)
 H04W 84/00 (2009.01)

(58) Field of Classification Search
 USPC .................................................. 701/1
 See application file for complete search history.

(56) References Cited

U.S. PATENT DOCUMENTS

| 10,560,937 | B2* | 2/2020 | Zhang | H04W 4/40 |
| 10,779,242 | B2 | 9/2020 | Wang et al. | |
| 10,798,662 | B2 | 10/2020 | Wang et al. | |
| 10,834,777 | B2* | 11/2020 | Babaei | H04W 76/28 |
| 11,032,849 | B2* | 6/2021 | Li | H04W 52/143 |
| 11,082,996 | B2* | 8/2021 | Li | H04L 1/0061 |
| 11,102,631 | B2* | 8/2021 | Zhang | H04W 52/346 |
| 2013/0288608 | A1 | 10/2013 | Fwu et al. | |
| 2015/0200756 | A1 | 7/2015 | Lee | |
| 2016/0044694 | A1 | 2/2016 | Park | |
| 2017/0019910 | A1 | 1/2017 | Seo | |
| 2017/0215098 | A1 | 7/2017 | Huang et al. | |
| 2017/0303214 | A1 | 10/2017 | Lim et al. | |
| 2018/0020339 | A1 | 1/2018 | Agiwal et al. | |
| 2018/0049129 | A1 | 2/2018 | Li et al. | |
| 2018/0139701 | A1 | 5/2018 | Wang et al. | |
| 2018/0146388 | A1 | 5/2018 | Lee et al. | |
| 2018/0176871 | A1 | 6/2018 | Li et al. | |
| 2018/0176892 | A1 | 6/2018 | Kim et al. | |
| 2019/0069200 | A1* | 2/2019 | Zhang | H04W 4/20 |
| 2019/0174432 | A1 | 6/2019 | Wang et al. | |
| 2019/0215897 | A1* | 7/2019 | Babaei | H04W 76/38 |
| 2019/0253977 | A1 | 8/2019 | Wang et al. | |
| 2020/0068534 | A1 | 2/2020 | Li et al. | |
| 2020/0145799 | A1 | 5/2020 | Baghel et al. | |
| 2020/0205089 | A1 | 6/2020 | Kim et al. | |
| 2020/0374817 | A1 | 11/2020 | Xue et al. | |
| 2020/0396701 | A1 | 12/2020 | Yi et al. | |
| 2021/0014800 | A1 | 1/2021 | Wang et al. | |
| 2021/0022142 | A1 | 1/2021 | Wu et al. | |
| 2021/0045061 | A1 | 2/2021 | Akkarakaran et al. | |
| 2021/0059006 | A1* | 2/2021 | Babaei | H04W 76/38 |
| 2021/0144665 | A1* | 5/2021 | Ryu | H04W 72/0446 |

FOREIGN PATENT DOCUMENTS

| CN | 106304366 A | 1/2017 |
| KR | 10-2016-0036649 A | 4/2016 |
| KR | 10-2016-0135735 A | 11/2016 |
| WO | 2015130060 A1 | 9/2015 |
| WO | 2015142037 A1 | 9/2015 |
| WO | 2016165124 A | 10/2016 |
| WO | 2016182292 A1 | 11/2016 |
| WO | 2017024586 A1 | 2/2017 |

OTHER PUBLICATIONS

ISA/KR, International Search Report and Written Opinion of the International Searching Authority, International Application No. PCT/KR2018/003478, dated Jun. 26, 2018, 13 pages.

Supplementary European Search Report dated Mar. 17, 2021 in connection with European Patent Application No. 18772610.4, 13 pages.

Supplementary Partial European Search Report dated Dec. 10, 2020 in connection with European Patent Application No. 18772610.4, 14 pages.

Catt, "Discussion on details of resource reselection," R1-1608716, 3GPP TSG RAN WG1 Meeting #86bis, Lisbon, Portugal, Oct. 10-14, 2016, 5 pages.

Intel Corporation, "Sidelink measurements for V2V sensing and resource re-selection procedures," R1-166511, 3GPP TSG RAN WG1 Meeting #86, Gothenburg, Sweden, Aug. 22-26, 2016, 5 pages.

3GPP TS 36.213 V14.2.9 (217-03), Technical Specification, 3rd Generation Partnership Project; Technical Specification Group Radio Access Network; Evolved Universal Terrestrial Radio Access (E-UTRA); Physical layer procedures (Release 14), Mar. 2017, 64 pages.

"3rd Generation Partnership Project; Technical Specification Group Radio Access Network; Evolved Universal Terrestrial Radio Access (E-UTRA); Multiplexing and channel coding (Release 14)", 3GPP TS 36.212 V14.1.1 (Jan. 2017), 149 pages.

Communication pursuant to Article 94(3) EPC dated Sep. 16, 2022 in connection with European Patent Application No. 18 772 610.4, 6 pages.

China National Intellectual Property Administration, "The First Office Action," dated Feb. 11, 2023, in connection with Chinese Patent Application No. 201810036887.8, 12 pages.

* cited by examiner

RESOURCE SELECTION METHOD IN VEHICLE TO EVERYTHING COMMUNICATION AND APPARATUS THEREFORE

CROSS-REFERENCE TO RELATED APPLICATIONS

This application is a continuation of application Ser. No. 16/490,408, which is the 371 National Stage of International Application No. PCT/KR2018/003478, filed Mar. 23, 2018, which claims priority to Chinese Patent Application No. 201710182401.7, filed Mar. 24, 2017, Chinese Patent Application No. 201710304754.X, filed May 3, 2017, Chinese Patent Application No. 201710486403.5, filed Jun. 23, 2017, Chinese Patent Application No. 201710488679.7, filed Jun. 23, 2017, Chinese Patent Application No. 201710682189.0, filed Aug. 10, 2017, Chinese Patent Application No. 201711059732.8, filed Nov. 1, 2017, Chinese Patent Application No. 201711160446.0, filed Nov. 20, 2017, and Chinese Patent Application No. 201810036887.8, filed Jan. 15, 2018, the disclosures of which are herein incorporated by reference in their entirety.

BACKGROUND

1. Field

The present disclosure generally relates to communication technology, and more particular, to a resource selection or reselection method and a user equipment (UE) performing the same in vehicle to every (V2X) communication, and to a resource allocation method and apparatus in sidelink communications with low delay and high reliability.

2. Description of Related Art

In the 3rd generation partnership project (3GPP) standard, a device-to-device direct communication link is referred to as a sidelink. Similar to uplink and downlink, there is also a control channel and data channel in sidelink, and the former is referred to as Physical Sidelink Control CHannel (PSCCH), and the latter is referred to as Physical Sidelink Shared CHannel (PSSCH). The PSCCH is used to indicate time/frequency domain resource positions, modulation and coding mode, and priorities of data carried in PSSCH of PSSCH transmission, while PSSCH is used to carry data.

Control information and data in Vehicle to Vehicle/Pedestrian/Infrastructure/Network or Vehicle to Everything (V2X) can be transmitted via sidelink, and at this time, the V2X communication comprises two transmission modes, i.e. transmission mode 3 (Mode 3) and transmission mode 4 (Mode 4). With regard to Mode 3, transmission resource of PSCCH and PSSCH of one UE (referred to a V2X UE, the same below) is both allocated by an evolved Node B (eNB), and the UE determines transmission resource of the PSCCH and the PSSCH by receiving a sidelink resource allocation indication transmitted by the eNB via a physical downlink control channel (PDCCH) or an Enhanced PDCCH (EPDCCH). However, in Mode 4, the transmission resource of the PSCCH and the PSSCH are selected autonomously by the UE according to channel detection results. During the channel detection process, the UE first determines time frequency resource position and priorities of scheduled PSSCH by receiving PSCCHs transmitted by other UEs, and then further detects demodulation-reference signal received power of scheduled PSSCH (PSSCH-RSRP), and excludes the resource with PSSCH-RSRP higher than a particular threshold; and the UE then calculates average received energy (S-RSSI) of the remaining resource, and at last randomly selects one resource from those with the lowest S-RSSI as transmission resource.

In the Rel-14 3GPP standard, whether the UE uses Mode 3 or Mode 4 is configured according to resource pool. In order to ensure that time frequency resource allocated to UE which uses Mode 3 is not interfered by other UEs, Mode 3 resource pool and Mode 4 resource pool should be mutually orthogonal. However, since the resource pool is semi-statically configured, while number of UEs using a certain resource pool is dynamically changed, if resource in the resource pool and number of UEs which use the resource pool are inharmonious, then resource waste or deficiency in the resource pool may be caused. Therefore, configuring a plurality of resource pools is not beneficial to improving the utilization efficiency of time frequency resource, and at the same time may also negatively impact the performance of a V2X system.

It can be seen from the above analysis that in view of resource utilization efficiency and V2X system performance, UEs of Mode 3 and Mode 4 should be able to work in the same resource pool; however, in this case, there is still no effective technical solution regarding how to effectively avoid or reduce mutual interference between UEs which use Mode 3 and Mode 4 by far.

In Mode 3, the transmission resources for the PSCCH and PSSCH of one UE (referred to V2X UE in the present disclosure) are both allocated by an eNodeB (shortened as eNB in the following). The UE may determine the transmission resources of the PSCCH and the PSSCH through receiving the sidelink resource allocation indication transmitted by the eNB via the PDCCH or EPDCCH. In Mode 4, however, the transmission resources of the PSCCH and PSSCH may be selected by the UE according to a channel detection result. If a UE in Mode 4 has V2X data to be transmitted in subframe n (e.g., the V2X data packet arrives at a UE radio access layer no later than subframe n), and a resource selection or reselection condition is met, the UE determines time-frequency resources in a resource selection window [n+T1, n+T2] on current working carrier as candidate single-subframe resources (values of T1 and T2 are determined by the UE, but should meet T1=4, 20≤=T2≤=100), then the UE determines available candidate single-subframe resources in the resource selection window. During the process of determining the available candidate single-subframe resources, the UE firstly determines the time-frequency resource positions and priority of a scheduled PSSCH of another UE through receiving the PSCCH transmitted by the another UE. Then, the UE detects a reference signal receiving power of the scheduled PSSCH (PSSCH-RSRP), and excludes the resources whose PSSCH-RSRP is higher than a predefined threshold (referred to as resource selection step 2 in the following). Further, the UE calculates an average Sidelink-Receiving Signal Strength Indicator (S-RSSI) of the remaining resources, the X % single-subframe resources with the lowest S-RSSI are determined as the available candidate single-subframe resources (hereinafter referred to as resource selection step 3). In 3GPP Rel-14 specifications, the value of X is 20. It should be noted that, the X % refers to the proportion of the available candidate single-subframe resources to all single-subframe resources in the resource selection window. The UE may randomly select one of the available candidate single-subframe resources as the transmission resource.

In the V2X communications, the data transmitted by one UE is meaningful for merely receiving UEs within a certain range. The range is related to the moving speed of the transmitting UE and the receiving UE, as well as service type of the transmitted data. In the current V2X communication mechanism based on LTE system architecture, data successful receiving rate within the valid distance (i.e., data reliability) can reach 95% at most. This reliability is able to meet requirement of basic security services. However, in application scenarios newly defined by the 3GPP such as platooning, advance driving and extended sensor, there is a higher requirement for the data receiving reliability. For example, in the platooning scenario, the highest reliability is required to reach 99.99%, and in the extended sensor scenario, the highest reliability is required to reach 99.999%. In addition, in the above new V2X application scenarios, a more rigid requirement is also proposed to the data transmission delay, the lowest delay is required to be 10 ms and 3 ms, but the current V2X communication mechanism can merely ensure a delay of 20 ms.

It can be seen from the above that, in order to support V2X communications in the new application scenarios, the data transmission reliability and data transmission delay of the V2X communication mechanism need to be improved. However, there is no effective solution at present.

In addition, in the V2X communication system defined by 3GPP Rel-14, the resource selection and resource reselection manner of the UE are merely applicable for the single-carrier working manner. In order to increase throughput and system capacity of the V2X system, in evolved V2X defined by 3GPP Rel-15, it is proposed to support multi-carrier sidelink communications. In the multi-carrier sidelink communication scenario, multiple carriers may belong to the same frequency band. The multiple carriers in the same frequency band may have In-Band Emission (IBE) interference and half-duplex restriction. In addition, the UE may perform transmission or receiving operations on multiple carriers of the same frequency band using one transmission or receiving radio link, which may lead to that the number of transmission or receiving radio chains of the UE is smaller than the number of carriers supported by the UE. Since the UE may select resources or transmit data simultaneously on multiple carriers, when the UE performs the resource selection or resource reselection, the channel status of multiple carriers may impact each other. It can be seen that, in the multi-carrier sidelink communication, when the UE performs resource selection or reselection, channel status on multiple carriers needs to be considered in combination. The resource selection and reselection manner designed for the single carrier environment in 3GPP Rel-14 is not applicable.

SUMMARY

It can be seen from the above that, in order to support multi-carrier sidelink communication, the resource selection or reselection manner of the UE need to be modified, so as to be applicable for the multi-carrier sidelink environment. However, there is no reasonable and effective solution at present.

The present disclosure is designed to address at least the problems and/or disadvantages described above and to provide at least the advantages described below.

According to one aspect of the present disclosure, a resource selection or reselection method performed by a user equipment (UE) in vehicle to vehicle/pedestrian/infrastructure/network or Vehicle to Everything (V2X) communication is provided, which comprises the steps of: detecting physical sidelink control channel (PSCCH) transmitted by other UE(s); selecting single-subframe resources from single-subframe resources which do not overlap with single-subframe resources reserved by the detected PSCCH; and transmitting physical sidelink shared channel (PSSCH) on the selected single-subframe resources.

According to another aspect of the present disclosure, a user equipment (UE) for performing a resource selection or reselection method in vehicle to vehicle/pedestrian/infrastructure/network or Vehicle to Everything (V2X) communication is provided, which comprises: a detection module, for detecting physical sidelink control channel (PSCCH) transmitted by other UE(s); a resource selection or reselection module, configured to select a single-subframe resource from single-subframe resources which do not overlap with single-subframe resources reserved by the detected PSCCH; and a transmitting module, which transmits physical sidelink shared channel (PSSCH) on the selected single-subframe resource.

With the above method and apparatus, interference on single-subframe resources scheduled or reserved by PSCCH resources can be better avoided, and the utilization efficiency of time frequency resources can be increased, and the V2X system performance can be improved.

Furthermore, in order to solve at least one of the above technical problems, embodiments of the present disclosure provide a new resource allocation method, so as to effectively improve data transmission reliability under the premise of ensuring the data transmission delay.

A resource allocation method in sidelink communications includes:

a first User Equipment (UE) determining a SideLink Grant (SLG); wherein the SLG includes position information of M Physical Sidelink Shared Channel (PSSCH) transmission resources, the M PSSCH transmission resources are used for M times of transmission of one Transmission Block (TB), M is a positive integer;

the first UE transmitting a PSSCH according to the determined SLG.

In some embodiments, the first UE determining the SLG includes:

the first UE determining the SLG according to one or more downlink control signaling transmitted by a base station; or the first UE determining the SLG through performing a detection in a channel detection window.

In some embodiments, when the first UE determines the SLG according to one downlink control signaling transmitted by the base station, the one downlink control signaling includes: positions of slots where the PSSCH transmission resources for the second time to the M-th time transmission are located, frequency-domain positions of the PSSCH transmission resources for each time of transmission, and the number of frequency-domain resources contained in the PSSCH transmission resources for each time of transmission; wherein the slot denotes a minimum resource unit for the first UE to transmit the PSSCH.

In some embodiments, the determining the SLG includes: taking a slot which is after slot n1+k and belongs to a current resource pool of the first UE as the slot where the PSSCH transmission resource for the first time transmission in the SLG is located; wherein n1 denotes an index of a slot in which the downlink control signaling is received, k is a positive integer.

In some embodiments, the first UE determines the configuration of the current resource pool according to the signaling transmitted by the base station.

In some embodiments, when the first UE determines the SLG according to multiple downlink control signaling of the base station, each one of the multiple downlink control signaling includes: positions of multiple PSSCH transmission resources for N times of transmission of one TB, wherein N=M, N is a positive integer.

In some embodiments, the determining the SLG comprises: for each downlink control signaling, taking slot n2+k as the slot where the first PSSCH transmission resource indicated by this downlink control signaling is located; wherein n2 denotes an index of a slot in which this downlink control signaling is received, k is a positive integer.

In some embodiments, each downlink control signaling includes an index of the downlink control signaling;

the determining the SLG includes: forming the SLG by the PSSCH time-frequency resources indicated by continuous M/N downlink control signaling indexed from 0 to M/N−1.

In some embodiments, there is a binding relationship between the M PSSCH transmission resources;

the first UE determining the SLG comprises: the first UE determining a resource pattern of the SLG according to the downlink control signaling transmitted by the base station; or, the first UE determining a resource pattern of the SLG according to the detection performed in the channel detection window;

the resource pattern includes M PSSCH transmission resource units in a predefined resource pattern space, and is used for indicating the position information of the PSSCH time-frequency resources for the M times transmission of the TB; a first PSSCH transmission resource unit and a last PSSCH transmission resource unit contained in each resource pattern have a time-domain gap less than or equal to a sum of a maximum tolerated delay for data transmission of the first UE and the time required for encoding the PSSCH.

In some embodiments, when the first UE determining the resource pattern according to the downlink control signaling transmitted by the base station, the downlink control signaling includes an index r of the resource pattern of the SLG, wherein the index of the resource pattern denotes unique index information of each resource pattern in the resource pattern space.

In some embodiments, the determining the resource pattern of the SLG includes: the first UE determining the first resource pattern with index of r after slot n3+k as the resource pattern of the SLG, and determining the resource pattern as allocated resources of the SLG; wherein n3 denotes an index of a slot in which the downlink control signaling is received, k is a positive integer.

In some embodiments, when the PSSCH and a Physical Sidelink Control Channel (PSCCH) scheduling the PSSCH are transmitted in the same slot, and a second UE semi-persistently occupies each PSSCH transmission resource with a predefined time interval, the first UE determining the SLG according to the detection performed in the channel detection window includes:

the first UE detecting slots in the channel detection window before slot n4, wherein for each detected slot, decoding the PSCCH in the slot, and determining the number of successfully decoded PSCCH in the slot, and measuring, according to the successfully decoded PSCCH, a reference signal receiving power and a receiving energy of the PSSCH scheduled by the PSCCH, a priority of the data transmitted by the PSSCH, and a reservation interval for the PSSCH transmission resource, the first UE measuring an average receiving energy of each Resource Block Group (RBG) or each Resource Block (RB) in the slot;

the first UE estimating, according to a measurement result in the channel detection window, the number of second UEs which may transmit PSCCH in each candidate slot in the resource selection window, a PSSCH reference signal receiving power on each candidate single-slot resource, and the average receiving energy of each RBG or RB in the resource selection window;

according to an estimated result, the first UE selecting, in all candidate single-slot resources in the resource selection window, M single-slot resources on which number of resources occupied by the second UE is lower than a predefined condition, and determining the selected M single-slot resources as the M PSSCH transmission resources of the SLG; the M single-slot resources are located in different slots;

wherein n4 denotes a slot in which the SLG determining operation is performed, the resource selection window is $[n4+T_1, n4+T_2]$, T1 and T2 are predefined positive integers; if the RBG is configured and the RBG is a resource allocation unit, and all PRBs in each RBG can be allocated, determining LRBG RBGs in any slot belonging to the current resource pool of the first UE and within the resource selection window as a candidate single-slot resource; if the RBG is configured and the RBG is a resource allocation unit, but only one PRB with the same index in respective RBG can be allocated, determining the i-th PRB in $\tilde{L}_{RBG}$ RBGs in any slot which is belonging to the current resource pool of the first UE and within the resource selection window as a candidate single-slot resource; if the RBG is not configured, determining LRB PRBs in any slot which is belonging to the current resource pool of the first UE and within the resource selection window as a candidate single-slot resource; LRBG, $\tilde{L}_{RBG}$, and LRB are positive integers; the second UE is a UE detected by the first UE; the PRB denotes a minimum frequency resource unit for transmitting the PSSCH by the first UE.

In some embodiments, the selecting the M single-slot resources includes:

the first UE selecting, according to the estimated result, X % slots with minimum number of successfully decoded PSCCH in the resource selection window as candidate slots;

the first UE excluding single-slot resources with PSSCH reference signal power higher than a specified threshold from the single-slot resources of the candidate slots according to the PSSCH reference signal receiving power and the priority of the data transmitted by the PSSCH, the specified threshold is determined according to the priority of the data transmitted by the PSSCH and the priority of the data to be transmitted by the first UE;

the first UE sorting remaining single-slot resources of the candidate slots according to their receiving energies, selecting M single-slot resources from Y % single-slot resources with lowest receiving energy, and taking the selected M single-slot resources as the M PSSCH transmission resources of the SLG;

X and Y are predefined positive values.

In some embodiments, the PSCCH transmitted by the first UE indicates only the time-frequency resource position of the currently scheduled PSSCH, or indicate the position of the currently scheduled PSSCH and the next PSSCH transmission, or indicate the position of M PSSCH transmission resources for transmitting one TB at the same time.

In some embodiments, when the second UE semi-persistently occupies the resource pattern according to a predefined interval, the first UE determining the resource pattern of the SLG according to the detection performed in channel detection window includes:

the first UE detecting slots in the channel detection window before slot n4; wherein for each detected slot, the first UE decoding a PSCCH in the slot, measuring average reference signal receiving power of multiple PSSCHs on the resource pattern, priority of data transmitted by the PSSCHs and a resource pattern reservation interval according to the decoded PSCCH, the first UE measuring an average receiving energy of each resource pattern in the channel detection window;

the first UE estimating, according to the measurement result in the channel detection window, PSSCH reference signal receiving power and average receiving energy of each candidate resource pattern in the resource selection window;

according to an estimated result, the first UE selecting one resource pattern from all candidate resource patterns in the resource selection window as the resource pattern of the SLG;

wherein n4 denotes a slot in which the SLG determining operation is performed, any resource pattern whose beginning subframe and ending subframe are both within the resource selection window is taken as the candidate resource pattern.

In some embodiments, the selecting one resource pattern includes:

according to the estimated result, the first UE excluding resource patterns whose PSSCH reference signal average receiving power is higher than a second specified threshold from the candidate resource patterns of the resource selection window, the second specified threshold is determined according to the priority of the data transmitted by the PSSCH and the priority of the data to be transmitted by the first UE;

the first UE sorting remaining resource patterns according to their average receiving energies, selecting one resource pattern from Y % resource patterns with lowest receiving energy, and taking the selected resource pattern as the resource pattern of the SLG;

wherein Y is a predefined positive integer.

In some embodiments, the PSCCH transmitted by the first UE is used for indicating an index of the transmission resource pattern of the PSSCH scheduled by the PSCCH.

In some embodiments, after the first UE determining the SLG and before the first UE transmitting the PSSCH according to the determined SLG, the method further comprises: the first UE determining an occupation manner of the SLG;

the transmitting the PSSCH according to the determined SLG comprises: the first UE transmitting the PSSCH according to the SLG based on the determined occupation manner.

In some embodiments, the occupation manner includes: occupying the SLG semi-persistently according to a predefined time interval; or occupying the SLG for one time.

In some embodiments, the determining the occupation manner of the SLG includes:

when the first UE determines the SLG according to one or more downlink control signaling transmitted by the base station, the first UE determining the occupation manner of the SLG according to the downlink control signaling; and/or when the first UE determines the SLG according to the detection performed in the channel detection window, the first UE determining the occupation manner of the SLG according to a decision of a higher layer of the first UE.

In some embodiments, when the first UE occupies the SLG semi-persistently according to a predefined period, the SLG further includes a period length of the semi-persistent occupation; and/or when there is no binding relationship between the PSSCH time-frequency resources and PSCCH resources scheduling the PSSCH, the one or more downlink control signaling include position of transmission resources of the PSCCH.

In some embodiments, when determining the SLG through channel detection, the first UE selects one PSCCH transmission resource according to a channel detection result.

In some embodiments, the method further includes:

the first UE determining a modulation and coding scheme for transmitting the TB.

A resource allocation apparatus for sidelink communications includes: a determining unit and a transmitting unit;

the determining unit is to determine a SideLink Grant (SLG); wherein the SLG includes position information of M Physical Sidelink Shared Channel (PSSCH) transmission resources, the M PSSCH transmission resources are used for M times of transmission of one Transmission Block (TB), M is a positive integer;

the transmitting unit is to transmit a PSSCH according to the determined SLG.

It can be seen from the above technical solution that, in the present disclosure, the first UE is able to determine the SLG through receiving downlink control signaling of the base station or through channel detection, the SLG may include multiple PSSCH transmission resources for transmitting one TB, or include a resource pattern corresponding multiple PSSCH transmission resources used for transmitting one TB. Then, the first UE transmits PSSCH according to the SLG. According to the method provided by the present disclosure, half-duplex impact between different UEs can be effectively decreased under the premise of ensuring the data transmission delay, thus the data successful receiving rate is increased.

Embodiments of the present disclosure further provide a resource selection or reselection method and apparatus in V2X communications, so as to overcome half-duplex restriction in the multi-carrier sidelink communication and reduce IBE interferences between multiple carriers.

Some embodiments of the present disclosure provide a resource selection or reselection method in V2X communication, including:

a User Equipment (UE) determining a carrier set C available for resource selection or reselection;

the UE determining a candidate single-subframe resource set S in the carrier set C; and the UE selecting at least one single-subframe resource from the set S, and transmitting a sidelink data channel on the selected resource.

In some embodiments, the carrier set C includes at least one carrier;

if the carrier set C includes at least two carriers, the configuration of Sidelink Synchronization Signal (SLSS) transmission subframes on the at least two carriers are the same;

or, if the carrier set C includes at least two carriers, the configuration of the SLSS transmission subframes on the at least two carriers are different, and if subframe x is one of the SLSS transmission subframes on any of the at least two carriers, subframe x on each of the at least two carriers is not used for configuring a resource pool;

or, if the carrier set C includes at least two carriers, for each of some or all of the at least two carriers, the SLSS transmission subframes and resource pool are configured independently.

In some embodiments, the determining the candidate single-subframe resource set S in the carrier set C includes:

determining that a single-subframe resource $R_{x,y}^c$ on any carrier c in the carrier set C includes $L_{subCH}^c$ continuous sub-channels starting from sub-channel x in subframe $t_y^{SL}$, wherein y denotes a relative index of subframe $t_y^{SL}$ in the resource pool;

$L_{subCH}^c$ denotes a number of sub-channels used for one PSSCH transmission on carrier c, c=0, 1, . . . , N1−1;

if the UE performs resource selection or reselection in subframe n, $L_{subCH}^c$ continuous sub-channels in any subframe belonging to the resource pool and within [n+T$_1$,n+T$_2$] on carrier c are candidate single-subframe resources, wherein the determination of T1 and T2 are subject to the implementation of the UE; a total number of single-subframe resources on carrier c is denoted by $M_{total}^c$ the $M_{total}^c$ candidate single-subframe resources constitute a set Sc, a union of single-carrier single-subframe resource sets of carriers in the carrier set C is the candidate single-subframe resource set S, wherein the single-carrier single-subframe resource is a single-subframe resource of which all subchannels are located on the same carrier.

In some embodiments, the UE selecting the at least one single-subframe resource in the set S via any one of:

the UE selecting one single-carrier single-subframe resource for data transmission in the set S, wherein the UE randomly selecting one single-carrier single-subframe resource with equal probability from the set S; or, the UE randomly selecting a carrier c with equal probability from all carriers in the carrier set C, and randomly selecting one single-carrier single-subframe resource with equal probability from the set Sc;

the UE selecting at least two single-carrier single-subframe resources for data transmission in the set S, wherein the UE randomly selecting multiple carriers or selecting all carriers with equal probability in the carrier set C, and randomly selecting one single-carrier single-subframe resource with equal probability from the single-carrier single-subframe resources of each selected carrier;

the UE selecting at least two single-carrier single-subframe resources for data transmission in the set S, wherein the UE sorting the carriers in the carrier set C according to their priorities or Channel Busy Ratio (CBR), the order of the carriers is denoted by carrier 0>carrier 1> . . . >carrier N1−1, the UE randomly selecting one single-carrier single-subframe resource with equal probability from the single-carrier single-subframe resources of carrier 0, the subframe where the selected single-carrier single-subframe resource is located is denoted by t0, if subframe t0 contains single-carrier single-subframe resource on carrier 1, the UE randomly selecting one single-carrier single-subframe resource from them with equal probability, if the subframe t0 does not contain single-carrier single-subframe resource on carrier 1, the UE randomly selecting one single-carrier single-subframe resource with equal probability from a single-carrier single-subframe resource set of carrier 1, and the UE repeating the process to select the single-carrier single-subframe resources on other carriers;

the UE selecting multiple single-carrier single-subframe resources for data transmission in the set S, wherein the UE selecting at most one single-carrier single-subframe resource on each carrier, and indexes of subframes where the single-carrier single-subframe resources selected by the UE are located have a minimum variance, if there are multiple selections with the minimum variance, the UE randomly selecting one of the selections;

the UE randomly selecting X1 single-carrier single-subframe resources with equal probability from remaining single-carrier single-subframe resources of each subset Sc of the set S, and the UE selecting me single-carrier single-subframe resources for transmitting the PSSCH from X1 single-carrier single-subframe resources selected from each set Sc, wherein c=0, 1, . . . , N1−1, and mc=0 or 1.

In some embodiments, before the UE selecting the at least one single-subframe resource in the set S, the method further includes: the UE excluding one or more candidate single-subframe resources from the set S according to a Physical Sidelink Control Channel (PSCCH) detected in a channel detecting window and an average Sidelink-Receiving Signal Strength Indicator (S-RSSI) measured in the channel detecting window;

the process of the UE selecting at least one single-subframe resource in the set S comprises: the UE selecting at least one single-subframe resource from remaining single-subframe resources in the set S.

In some embodiments, the process of the UE excluding one or more candidate single-subframe resources from the set S according to a Physical Sidelink Control Channel (PSCCH) detected in the channel detecting window and the S-RSSI measured in the channel detecting window includes:

if the UE detects the PSCCH in subframe $t_m^{SL}$ in the channel detection window on carrier c, c=0, 1 . . . , N1−1, and a value of a priority field in the PSCCH is prio$_{RX}$, according to a resource reservation indication, the PSCCH reserves the same frequency resource in subframe $t_{m+P_{rsvp\_RX}}^{SL}$, and a PSSCH-Reference Signal Received Power (RSRP) measured on a PSSCH scheduled by the PSCCH is higher than a threshold $Th_{prio_{TX},prio_{RX}}^c$, wherein prio$_{RX}$ denotes a value of a priority field in a subsequently transmitted PSCCH indicated by a higher layer of the UE, $Th_{prio_{TX},prio_{RX}}^c$ denotes a threshold for the PSSCH-RSRP when the value of the priority field of the subsequently transmitted PSCCH indicated by the higher layer of the UE is prio$_{TX}$, whereas the measured priority of the PSCCH is prio$_{RX}$; then:

for any single-carrier single-subframe resource $R_{x,y}^c$ in a subset Sc of the set S, if there is a variable j∈{0, 1, . . . , C$_{resel}$−1} which makes the single-subframe resource $R_{x,y+j\times P_{rsvp\_TX}}^c$ overlap with reserved resource indicated in the PSCCH, wherein Cresel denotes the number of times that the resource is to be reserved after resource reselection of the UE, P$_{rsvp\_TX}$ denotes an assumed resource reservation period for determining the available candidate single-subframe $R_{x,y}^c$ resource indicated by higher layer of the UE, the UE deleting the single-subframe resource from the set Sc;

for any remaining single-subframe resource $R_{x,y}^c$ in subset Sc of the set S, c=0, 1, . . . , N1−1, the UE calculates an average value of the S-RSSI measured on subchannels x+k' in subframe $t_{y-P*j}^{SL}$ in the channel detection window, wherein j is an integer larger than 0, and k'=0, . . . , $L_{subCH}^c$−1, P is a predetermined value and denotes an S-RSSI average period, the average value of S-RSSI is noted by $E_{x,y}^c$, the UE excluding (100−X2)% resources with highest $E_{x,y}^c$ from the remaining single-subframe resources from the set Sc, wherein X2 is a predefined value.

In some embodiments, wherein the process of the UE determining the candidate single-subframe resource set S in the carrier set C includes:

dividing the carriers in the carrier set C into at least one carrier group, each carrier group consists of at least one carrier, the carrier set C includes R carrier groups, the number of carriers in carrier group G is M1, wherein G=0, 1, . . . , R−1, M1≤N1, and M1>1, N1 denotes the number of carriers in the carrier set C, the carriers in the carrier group G are denoted by g0, g1, . . . , gM1−1;

determining that one carrier-group single-subframe resource $R_{x_g,y}^G$ in carrier group G includes $L_{subCH}^{g0}$ continuous subchannels starting from subchannel $x_{g_0}$ on carrier g0 of subframe $t_y^{SL}$, $L_{subCH}^{g1}$ continuous subchannels starting from subchannel $x_{g_1}$ on carrier g1 of subframe $t_y^{SL}$, . . . , and $L_{subCH}^{gM1-1}$ continuous subchannels starting from subchannel $x_{g_M-1}$ on carrier gM1−1 of subframe $t_y^{SL}$, wherein y denotes a relative index of the subframe $t_y^{SL}$ in the resource pool;

$L_{subCH}^{g1}$ meets $$\sum_{i=0}^{i=M1-1} L_{subCH}^{g1} = L,$$

L is determined by a higher layer of the UE, i=0, 1, . . . , M1−1;

if the UE performs resource selection or reselection in subframe n, $L_{subCH}^{g0}$, $L_{subCH}^{g1}$, . . . , $L_{subCH}^{gM1-1}$ continuous subchannels respectively on carriers g0, g1 . . . , gM1−1 in any subframe belonging to the resource pool and within [n+T$_1$,n+T$_2$] on the carrier group G are determined as the candidate single-subframe resources, wherein the values of T1 and T2 are subject to the implementation of the UE; a total number of single-subframe resources in carrier group G is denoted by $M_{total}^G$, the $M_{total}^G$ candidate single-subframe resources constitute the set $S^G$; $L_{subCH}^{g0}$, $L_{subCH}^{g1}$, . . . , and $L_{subCH}^{gM1-1}$ are greater than or equal to 0; a union of all carrier-group single-subframe resource sets of the carrier set C is the candidate single-subframe resource set S, wherein the carrier-group single-subframe is a single-subframe resource which includes subchannels located on at least one carrier of one carrier group.

In some embodiments, the process of the UE selecting at least one single-subframe resource in the set S according to any one of:

the UE selecting one carrier-group single-subframe resource for data transmission in the set S, wherein the UE randomly selects one carrier-group single-subframe resource with equal probability from the set S; or, the UE randomly selects one carrier group G with equal probability from all carrier groups of the carrier set C, and randomly selects one carrier-group single-subframe resource with equal probability from the set SG;

the UE selecting multiple carrier-group single-subframe resources for data transmission from the set S, wherein the UE selects at most one carrier-group single-subframe resource in each carrier group; or, the UE randomly selects at least two carrier groups with equal probability or selects all carrier groups of carrier set C, and randomly selects one carrier-group single-subframe resource with equal probability in each selected carrier group.

In some embodiments, before the UE selecting the at least one single-subframe resource in the set S, the method further includes: the UE excluding one or more candidate single-subframe resources from the set S according to a PSCCH detected in the channel detecting window and an S-RSSI measured in the channel detection window;

the process of the UE selecting at least one single-subframe resource in the set S comprises: the UE selecting at least one single-subframe resource in remaining carrier-group single-subframe resources of the set S.

In some embodiments, the process of the UE excluding one or more candidate single-subframe resources from the set S according the PSCCH detected in the channel detecting window and the S-RSSI measured in the channel detecting window includes:

if the UE detects the PSCCH in subframe $t_m^{SL}$ in the channel detection window on carrier c, c=0, 1, . . . , N1−1, and a value of a priority field in the PSCCH is prio$_{RX}$, according to a resource reservation indication, the PSCCH reserves the same frequency resource in subframe $t_{m+P_{rsvp\_RX}}^{SL}$, and the PSSCH-RSRP measured on a PSSCH scheduled by the PSCCH is higher than a threshold Th$_{prio_{TX},prio_{RX}}^c$, wherein prio$_{RX}$ denotes a value of the priority field in a subsequently transmitted PSCCH indicated by a higher layer of the UE, Th$_{prio_{TX},prio_{RX}}^c$ denotes a threshold for the PSSCH-RSRP when the value of the priority field of the subsequently transmitted PSCCH indicated by the higher layer of the UE is prio$_{TX}$, whereas the measured priority of the PSCCH is prio$_{RX}$; then:

if carrier c belongs to carrier group G, for any carrier-group single-subframe resource $R_{x_g,y}^G$ in subset SG of set S, if there is a variable j∈{0, 1, . . . , C$_{resel}$−1} which makes a carrier-group single-subframe resource $$R_{x_g,y+j\times P_{rsvp\_TX}}^G$$

overlap with the reserved resource indicated in the PSCCH, wherein Cresel denotes the number of times of that the resource is to be reserved after resource reselection of the UE, P$_{rsvp\_TX}$ denotes an assumed resource reservation period for determining the available candidate single-subframe resource indicated by higher layer of the UE, the UE deleting the single-subframe resource $R_{x_g,y}^G$ from the set SG;

for any remaining single-subframe resource $R_{x_g,y}^G$ in subset SG of the set S, G=0, 1, . . . , R−1, the UE calculating an average value of the S-RSSI measured on subchannels x=k' on carrier gi in subframe $t_{y-P*j}^{SL}$ in the channel detection window, wherein j is an integer larger than 0, i=0, 1 . . . , M1−1 and k'=0, . . . , $L_{subCH}^c$−1, P is a predetermined value and denotes an S-RSSI average period; the value of the S-RSSI is noted by $E_{x,y}^G$; the UE excluding 1−X2% resources with highest $E_{x,y}^G$ from the remaining single-subframe resources in the set SG, wherein X2 is a predefined value.

In some embodiments, before the UE selecting the at least one single-subframe resource in the set S, the method further includes: if the UE is to perform a receiving operation in at least one subframe after subframe n on at least one carrier, the UE excluding one or more candidate single-subframe resources which overlap or conflict with the at least one subframe from the set S.

In some embodiments, the receiving operation that the UE is to perform includes any one of:

receiving SLSS in subframe m on at least one carrier according to an SLSS receiving rule;

receiving a downlink control or data channel in subframe m on at least one carrier according to a downlink receiving control behavior or a data channel receiving behavior, wherein the downlink control or data channel includes at least one of:

a Physical Downlink Control Channel (PDCCH) indicating a Random Access Response (RAR) and a Physical Downlink Shared Channel (PDSCH) carrying the RAR;

a Physical Broadcast Channel (PBCH);

a PDCCH indicating transmission of broadcast signaling and PDSCH carrying the broadcast signaling; and a PDSCH transmitted in a Semi-Persistent Scheduling (SPS) manner.

In some embodiments, the method further includes:

after the UE selects the at least one single-subframe resource, occupying the selected single-subframe resource for Y1 periods following a predefined resource reservation periodicity in a semi-persistent manner; when the UE occupies the selected single-subframe resource in the semi-persistent manner, if the size of data packets transmitted by the UE changes, and new data packets cannot be born by the current single-subframe resource even if the highest allowable modulation level and rate are used, the UE giving up the currently selected single-subframe resource, and reselecting a single-subframe resource according to the resource selection or reselection method; or, the UE keeping the currently selected single-subframe resource, and executing the resource selection or reselection method to select an additional single-subframe resource on a carrier other than that where the current single-subframe resource is located.

In some embodiments, before transmitting the PSSCH, the method further includes:

if the UE is to transmit signals on multiple carriers simultaneously, and the number of carriers on which the UE needs to perform transmission simultaneously is greater than the number of current available radio transmission chains of the UE, the UE prioritizing transmission of signals with a high priority and giving up transmission of signals with a low priority;

if the UE is to transmit signals simultaneously on two or more carriers, and the UE does support simultaneous transmission on multiple carriers, the UE prioritizing transmission of signals with a high priority and giving up transmission of signals with a low priority;

if the UE is to transmit signals on at least two carriers simultaneously, the UE adjusting a transmit power, wherein the signals include at least one of PSSCH, PSCCH and uplink signals;

the UE adjusting the transmit power according to the following:

process 1, if the value of a priority field of the PSCCH transmitted by the UE on at least one carrier is greater than or equal to thresSL-TxPrioritization, wherein thresSL-TxPrioritization denotes a specific priority threshold, the UE adjusting a sidelink transmit power on one or more carriers whose priority field has the value greater than or equal to thresSL-TxPrioritization, so as to make a total transmit power of the UE lower than an allowable maximum transmit power PCMAX of the UE;

process 2, if values of priority fields of the PSCCH on all current sidelink carriers of the UE are lower than thresSL-TxPrioritization, or the total transmit power is still higher than PCMAX after the UE adjusts the transmit power on all carriers meeting the condition in process 1 to 0, and the UE transmits uplink signals on at least one carrier, the UE adjusting the transmit power of the uplink signals on the at least one carrier, so as to make the total transmit power of the UE lower than the allowed maximum transmit power PCMAX of the UE;

process 3, if the values of the priority fields of the PSCCH on all current sidelink carriers of the UE are lower than thresSL-TxPrioritization, and the UE does not transmit uplink signal on any carrier, the UE adjusting the sidelink signal transmit power on the carriers, so as to make the total transmit power of the UE lower than the allowed maximum transmit power PCMAX of the UE;

or, the UE adjusting the transmit power according to the following:

the UE determining a priority of the transmission signal on each carrier, adjusting the transmit power of at least one carrier for transmitting data with lowest priority, so as to make the total transmit power of the UE lower than the allowed maximum transmit power PCMAX of the UE; if the total transmit power of the UE is still higher than PCMAX after the transmit power of the at least one carrier with the lowest priority is adjusted to 0, the UE repeating the above operations for remaining carriers until the total transmit power of the UE is lower than the allowed maximum transmit power PCMAX of the UE;

wherein the priority of the sidelink signal is determined by the value of the priority field in the PSCCH of the sidelink signal; the higher the value of the priority field, the lower the priority level; if there are uplink signals, the priority of the uplink signals is higher than the sidelink signal with priority value thresSL-TxPrioritization, but lower than the sidelink signal with priority value thresSL-TxPrioritization-1, thresSL-TxPrioritization denotes a specific priority threshold.

Embodiments of the present disclosure also provide a User Equipment (UE) for resource selection or reselection in a Vehicle to Vehicle/Pedestrian/Infrastructure/Network or Vehicle to Everything (V2X) communication, including: a candidate time-frequency resource determining module, a resource selection or reselection module and a transmitting module; wherein the candidate time-frequency resource determining module is to determine at least one carrier on which the UE performs channel detection, and to determine a candidate single-subframe resource set;

the resource selection or reselection module is to select one or more single-subframe resources for data transmission from the candidate single-subframe resource set; and the transmitting module is to transmit PSSCH on the selected one or more single-subframe resources.

According to the above method and apparatus, the UE firstly determines a carrier set C available for resource selection or reselection and a candidate single-subframe resource set S in the carrier set C. Then, the UE excludes some candidate single-subframe resources from the set S according to a channel detection result. Finally, the UE selects one or more single-subframes from the remaining single-subframe resources of eh set S for PSSCH transmission. Through the technical solution provided by the present disclosure, the probability of selecting the frequency resources in the same subframe is increased when the UE performs resource selection or reselection on multiple carriers, which effectively overcomes the half-duplex restriction and IBE interference existing in the multi-carrier sidelink communication scenario, and improves the performance of the V2X system.

BRIEF DESCRIPTION OF THE DRAWINGS

The above said and/or additional aspects and advantages will become obvious and be easily understood from the following description of the embodiments in combination with the accompanying drawings, wherein.

DETAILED DESCRIPTION

Figure 1:
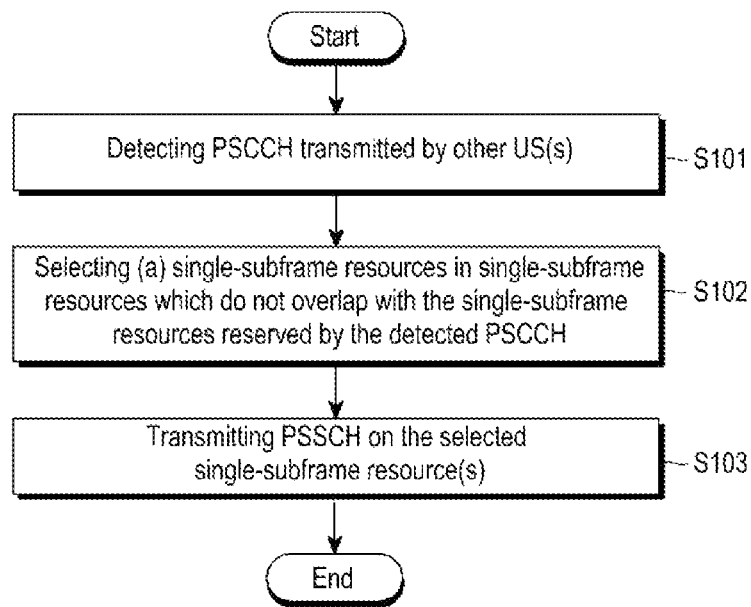
FIG. 1 is a flow chart of a resource selection or reselection method according to an embodiment of the present disclosure.

The embodiments of the present disclosure will be described in detail below. Examples of said embodiments are shown in the accompanying drawings, and the same or similar reference represents the same or similar element or elements with same or similar functions throughout the disclosure. In the following, the described embodiments referring to the accompanying drawings are exemplary and only used to illustrate the present disclosure, but not intend to be interpreted as the limit of the present disclosure.

Those skilled in the art may understand that unless stated intentionally, the singular forms "a", "an", "said" and "the" used herein may also comprise plural forms. It should also be further understood that the wording "comprise" used in the specification of the present disclosure refers to the existence of the feature, integer, step, operation, element and/or component, but does not exclude the existence or adding of one or more other features, integers, steps, operations, elements, components and/or combinations thereof. It should be understood that when we say that an element is "connected" or "coupled" to another element, it can be directly connected or coupled to another element, or there may also be an intermediate element. In addition, the "connection" or "coupling" used herein may comprise wireless connection or wireless coupling. The wording "and/or" used herein comprises all or any unit and all combinations of one or more associated listed items.

Those skilled in the art may understand that unless defined otherwise, all the terms used herein (comprising technical terms and scientific terms) have the same meanings as generally understood by those of ordinary skills in the art of the present disclosure. It should also be understood that those terms defined in general dictionaries should be understood to have meanings consistent with those in the context of the prior art, and unless specially defined like here, those terms will not be construed by ideal or excessively formal meanings.

Those skilled in the art may understand that the "user equipment" and "terminal device" used herein comprise both a device of a wireless signal receiver, which is a device only having a wireless signal receiver with no transmitting capability, and a device comprising receiving and transmitting hardware, which is a device having receiving and transmitting hardware that is able to perform bidirectional communication on a bidirectional communication link. Such device may comprise: cellular or other communication devices, which have a single circuit display or a multi-circuit display, or cellular or other communication devices without a multi-circuit display; a PCS (Personal Communications Service), which may combine voice, data processing, fax and/or data communication capabilities; a PDA (Personal Digital Assistant), which may comprise a radio frequency receiver, pager, Internet/Intranet access, network browser, notepad, calendar and/or GPS (Global Positioning System) receiver; and a conventional laptop and/or palmtop computer or other devices, which have a conventional laptop and/or palmtop computer or other devices comprising a radio frequency receiver. The "user equipment" and "terminal device" used herein may be portable, transportable and mounted in means of transportation (air, maritime and/or land), or appropriate and/or configured to run locally, and/or to run on earth and/or run at any other position in space in a distributed form. The "user equipment" and "terminal device" used herein may further be a communication terminal, Internet access terminal, music/video playing terminal, for example, may be a PDA, MID (Mobile Internet Device) and/or mobile phone having a music/video playing function, and may also be a smart television, set top box, and the like.

In order to increase resource utilization efficiency and improve V2X system performance at the same time, it is necessary for UEs which use Mode 3 and UEs which use Mode 4 to work in the same resource pool. In this case, in order to avoid or reduce mutual interference between the two kinds of UE, the present application proposes a resource selection and reselection method in V2X communication.

FIG. 1 is a flow chart of a resource selection or reselection method according to an embodiment of the present disclosure.

Referring to FIG. 1, in step 101, a UE detects physical sidelink control channel (PSCCH) in a format of Sidelink Control Information (SCI) x transmitted by other UEs. For example, the UEs are UEs using Mode 4. The UE detects the PSCCH transmitted by other UEs to obtain at least one of the following information: a transmission mode used by the UE which transmits the PSCCH, a priority of PSSCH scheduled by the PSCCH, frequency domain resource position of PSSCH scheduled by the PSCCH, a resource reservation period indicated by the PSCCH and the like.

The UE may detect SCI x on all PSCCH resources in a transmission resource pool currently selected by the UE, or only detect SCI x on some PSCCH resources in the transmission resource pool currently selected by the UE, for example, the UE determines positions of the some PSCCH resources by receiving signalling of an eNB. For example, the UE only detects SCI x on the last PSCCH resource on the frequency domain in each subframe in the transmission resource pool currently selected by the UE, or only detects SCI x on the last PSCCH resource on the frequency domain in some subframes in the transmission resource pool currently selected by the UE.

In step 102, the UE selects a single-subframe resource from single-subframe resources which do not overlap with single-subframe resources reserved by the detected PSCCH.

Defining a single-subframe resource, $R_{x,y}$ is $L_{subCH}$ continuous subchannels starting from subchannel x on TTI $t_y^{SL}$, wherein y represents a relative index of the TTI $t_y^{SL}$ in the resource pool, and $L_{subCH}$ is determined by high layers of UE, and represents the number of subchannels used for PSSCH transmission. If the UE performs resource selection or reselection on subframe n, then the UE should consider $L_{subCH}$ continuous subchannels on any one of subframes belonging to the resource pool within a range $[n+T_1,n+T_2]$ as candidate single-subframe resources, wherein T1 and T2 are determined by the UE embodiment, and T1≤4, 20≤T2≤100, denoting the total number of single-subframe resources as Mtotal, and a set composed of Mtotal candidate subframe resources as S. It should be specially noted that if the UE uses multiple TTI lengths in the resource pool, for example, some UEs use TTI of 1 ms length, and some other UEs use TTI of 0.5 ms length, the UE may consider that TTI length of single-subframe resource is the same as TTI length used by the UE when performing resource selection or reselection.

For any one single-subframe resource $R_{x,y}$ in the set S, if there is a variable j∈{0, 1, . . . , $C_{resel}$−1} that makes a single-subframe resource $R_{x,y+j\times P_{rsvp\_TX}}$ overlap with a reserved resource indicated by the SCI x, wherein Cresel represents the number of times that resources are planned to be reserved after UE resource reselection, and $P_{rsvp\_TX}$ represents a resource reservation interval assumed when determining available candidate single-subframe resources which is indicated by UE high layer, then the UE excludes the single-subframe resource $R_{x,y}$ when selecting or reselecting resources.

According to one embodiment of the present disclosure, if the detected SCI x is in a particular format, then a single-subframe resource is selected from single-subframe resources which do not overlap with single-subframe resources reserved by the detected PSCCH.

According to another embodiment of the present disclosure, if the detected SCI x is in a particular format, and value of the filed priority, $prio_{RX}$, contained in the SCI x is greater than a certain value, then a single-subframe resource is selected from single-subframe resources which do not overlap with single-subframe resources reserved by the detected PSCCH.

For example, the particular PSCCH format is SCI 1 defined in 3GPP release 14, or a format different from the SCI 1 defined in 3GPP release 14, or a format which contains the same number of bits as SCI 1, meanings of fields in which are the same with those in SCI 1 defined in 3GPP release 14, and one or more particular bits in reserved bits filed are 1.

According to yet another embodiment of the present disclosure, the UE further measures a sidelink reference signal received power of a PSSCH (PSSCH-RSRP) scheduled by SCI x. If the PSSCH-RSRP is higher than a particular threshold, then a single-subframe resource is selected from single-subframe resources which do not overlap with single-subframe resources reserved by the detected PSCCH. Specifically, value of priority filed contained in SCI x is $prio_{RX}$, a single-subframe resource where a PSSCH scheduled by the SCI x is $R_{xr,m}$, and value of PSSCH-RSRP measured by the UE on the single-subframe resource $R_{xr,m}$ is greater than $Th_{prio_{TX}+\Delta,prio_{RX}}$ wherein $prio_{TX}$ represents value of a priority filed of a PSCCH to be transmitted next which is indicated by UE higher layer, Δ is a value configured or preconfigured by the eNB, and $Th_{prio_{TX}+\Delta,prio_{RX}}$ represents an ith SL-ThresPSSCH-RSRP in SL-ThresPSSCH-RSRP-List-r14 defined in 3GPP standard 36.331 V14.1.0, wherein i=$(prio_{TX}+\Delta)*8+prio_{RX}+1$, then the UE excludes the single-subframe resource Rx,y from S when selecting or reselecting resources.

The UE further excludes resources in the set S in a manner defined in 3GPP release 14.

In step 103, the UE transmits a physical sidelink shared channel (PSSCH) on selected single-subframe resources.

The above technical solution of the present application will be further described in interaction between devices, combined with specific application cases below.

Case I

In case I, the SCI x is type I, and type I may be a new PSCCH format different from existing SCI 1 (i.e. SCI 1 defined in 3GPP release 14), or type I has the same number of bits as the existing SCI 1, and the meanings of various fields are the same, but one or more particular bits in reserved bits field may be 1 (all bits in reserved bits field of existing SCI 1 are 0). A UE selects single-subframe resources from single-subframe resources which do not overlap with single-subframe resources reserved by detected PSCCH when performing resource selection or reselection. The specific steps are as follows:

in step 201, a UE detects SCI x transmitted by other UE(s).

For example, in this case, UEs transmitting the SCI x are UEs using Mode 3.

According to one implementation of this case, a UE using Mode 3 determines values of various fields in the SCI x by receiving physical layer control signalling of an eNB. The physical layer signalling should at least contain a value of a "number of subframes in a resource pool corresponding to a resource reservation interval" field in the SCI x indicated, and a value of "number of subchannels and positions of contained subchannels" field in the SCI x. Preferably, the physical layer signalling is UE-specific signalling, scrambled by a particular cell radio network temporary identifier (C-RNTI), and choosing which UE as a transmitting UE of the SCI x is determined by the eNB implementation. According to another implementation of this case, a UE using Mode 3 determines values of various fields in the SCI x by receiving physical layer control signalling and higher layer signalling of an eNB. The physical layer signalling should at least contain a value of a "number of subframes in a resource pool corresponding to a resource reservation interval" field in the SCI x indicated, and the higher layer signalling should contain a value of a "number of subframes in a resource pool corresponding to a resource reservation interval" field in the SCI x indicated. The physical layer control signalling in the above two implementations should be distinguished from the downlink control indication format 5A (DCI 5A) defined in a current standard. The UE which receives the physical layer control signalling only transmits SCI x according to the indication, but does not transmit PSSCH on indicated frequency resources.

According to implementation I of this case, SCI x differs from the existing SCI 1, and the content of the SCI x should contain one or more items of the following information: priority information, the number of subframes in a resource pool corresponding to a resource reservation interval D1, CRC, a subframe gap of a first reserved resource G1, and the number and positions of subchannels contained in single-subframe resources, wherein a subframe position of the first reserved resource means a gap between a subframe where the SCI x is located and a subframe where the first reserved resource is located. If the subframe where the SCI x is located is m, then in this case, the UE considers that resources indicated by a "number of subchannels and positions of contained subchannels" field on subframe m+j×G1+i×D1 have been reserved, wherein i=0, 1, 2, . . . , M'−1, the value of M' is defined by standard or configured by the eNB, and M' can be positive infinity; and j=0 and/or 1, the specific value is defined by a standard or configured by the eNB. It needs to be specially noted that if D1 in the SCI x is indicated as a particular value, e.g. 0, or the SCI x does not contain "the number of subframes in a resource pool corresponding to a resource reservation interval D1", then the UE may replace D1 in the formula m+j×G1+i×D1 with Pstep or Pmin, wherein Pstep is a basic resource reservation interval of a current resource pool, while Pmin is a minimum resource reservation interval supported by the current resource pool. UE determines specific values of these two parameters by receiving eNB signalling, standard definition or preconfiguration.

According to implementation II of this case, fields and the number of bits of each field contained in the SCI x and the existing SCI 1 are the same, while a certain or certain particular bit(s) in seven bits in reserved bits field are 1, for example, the first bit in the reserved bits field is 1, in order to distinguish SCI x from SCI 1. If the subframe where the SCI x is located is m, then in this case, the UE considers that resources indicated by a "positions of frequency resources and the number of contained subchannels" field on subframe m+j×G2+i×D2 are reserved, wherein i=0, 1, 2, . . . , M'−1, the value of M' is defined by a standard or configured by the eNB, and M' can be positive infinity; j=0 and/or 1, the specific value is defined by a standard or configured by the eNB; and G2 is a value of a time gap between initial transmission and retransmission in the SCI 1, and D2 is the number of subframes corresponding to a value of a resource reservation interval field in the SCI 1.

In step 202, with regard to any one single-subframe resource $R_{x,y}$ in the set S, if there is a variable j∈{0, 1, . . . , $C_{resel}$−1} that makes a single-subframe resource $R_{x,y+j\times P_{rsvp\_TX}}$ overlap with a reserved resource indicated by the SCI x, wherein Cresel represents the number of times that resources are planned to be reserved after UE resource reselection, and $P_{rsvp\_TX}$ represents a resource reservation interval assumed when determining available candidate single-subframe resources which is indicated by the UE high layer, then the UE excludes the single-subframe resource Rx,y from S when selecting or reselecting resources. Or, if a value $prio_{RX}$ of a priority field (Priority) contained in the SCI x is greater than a particular value, then the UE excludes the single-subframe resource $R_{x,y}$ from S in resource selection or reselection.

The UE may further exclude resources in the set S in a manner defined in 3GPP release 14.

The UE randomly selects one single-subframe resource from the remaining resources for data transmission.

In step 203, the UE transmits the PSCCH on a PSCCH resource corresponding to the selected single-subframe resource, and transmits the PSSCH on the selected single-subframe resource.

Case II

In case II, the SCI x may be type II or type III, wherein type II is the same as the existing SCI 1 (i.e. SCI 1 defined in 3GPP release 14), and preferably, a transmitting UE of type II is a Rel-14 UE working in Mode 3. Type III is different from the SCI 1, for example, the value(s) of one or more particular bits in reserved bits field is(are) 1. Preferably, a transmitting UE of type III is a new release UE working in Mode 4. According to implementation I of this case, if the data transmitted by a new release UE working in Mode 3 needs to be received by a legacy UE, the new release UE of Mode 3 transmits SCI type II. According to implementation II of this case, if the data transmitted by a new release UE working in Mode 3 needs to be received by a legacy UE, the new release UE of Mode 3 transmits SCI type III. At the same time, SCI x type I, type II and type III are different from each other. If the SCI x received by the UE is type II, then after the UE receives the SCI x, the UE may further measure PSSCH-RSRP of a PSSCH scheduled by the SCI x. When the UE performs resource selection or reselection, with regard to any one single-subframe resource in candidate single-subframe resource set S, if it may overlap with a single-subframe resource reserved by the UE transmitting SCI x, then the UE should directly exclude it; or, if it may overlap with a single-subframe resource reserved by the UE transmitting SCI x, and the measured PSSCH-RSRP is greater than a certain particular threshold, then the UE should exclude the single-subframe resource; and preferably, the value of the particular threshold should be higher than $Th_{prio_{TX},prio_{RX}}$ wherein $prio_{RX}$ is a value of a priority field contained in the SCI x, $prio_{TX}$ represents a value of a priority field of PSCCH to be transmitted next indicated by a UE high layer, and $Th_{prio_{TX},prio_{RX}}$ represents an ith SL-ThresPSSCH-RSRP in SL-ThresPSSCH-RSRP-List-r14 defined in 3GPP standard 36.331 V14.1.0, i=$prio_{TX}$*8+$prio_{RX}$+1. If the SCI x received by the UE is type III, then after receiving the SCI x, the UE further measures PSSCH-RSRP of a scheduled PSSCH, and when the UE performs resource selection or reselection, with regard to any one single-subframe resource in candidate single-subframe resource set S, if the single-subframe resource may overlap with a single-subframe resource reserved in the SCI x, and the measured PSSCH-RSRP is greater than a certain particular threshold, then the UE should exclude the single-subframe resource. Preferably, only when the UE works in a particular resource pool configured by an eNB, the following operations will be performed, for example, the particular resource pool is a transmitting resource pool configured for a 3GPP release 14 Mode 3 UE. The steps are as follows:

in step 301, a UE detects SCI x transmitted by other UE(s).

In this case, if the SCI x received by the UE at subframe M' is completely the same as the existing SCI 1, the UE can determine reserved resource in the following two ways:

Way 1: the UE considers that resources indicated by a "positions of frequency resources and the number of contained subchannels" field on subframe m+j×G3+i×D3$_l$ are reserved, wherein i=0, 1, 2, . . . , M'−1, the value of M' is defined by a standard or configured by the eNB, and M' can be positive infinity. It should be specially noted that the value of M' can be related to value of D3$_l$. For example, when D3$_l$ is 100, M' is 1. If D3$_l$ is p and p is smaller than 100, M' is equal to 100/p. j=0 and/or 1, the specific value is defined by a standard or configured by the eNB; and G3 is a value of a time gap between initial transmission and retransmission in the SCI 1, and D3 is the number of subframes corresponding to a value of a resource reservation interval field in the SCI 1. l=0, 1, . . . , N'−1, and value of individual element in the set {D30, D31, D32, . . . , D3N−1} is indicated via RRC layer signaling or physical layer signaling by eNB. If it is implementation I of this case, the set can represent number of subframes corresponding to SPS period used by the Rel-14 UE working in Mode 3 in the current resource pool. If it is implementation II of this case, the set can represent number of subframes corresponding to SPS period(s) used by the Rel-14 UE working in Mode 3, and number of subframes corresponding to SPS period(s) used by the new release UE working in Mode 3 and transmitting the date that needs to be received by a legacy UE.

Way 2: If the number of subframes corresponding to the value of Resource reservation interval field in SCI x is zero, UE determines reserved resource in Way 1; If the number of subframes corresponding to the value of Resource reservation interval field in SCI x is more than zero, it is considered that the resource(s) indicated by the "positions of frequency resources and the number of contained subchannels" field in subframe m+j×G3+i×D3 is/are reserved, wherein i=0, 1, 2, . . . , M'-1, the value of M' is defined by a standard or configured by the eNB, and M' can be positive infinity. It should be specially noted that the value of M' can be related to value of D3. For example, when D3 is 100, M' is 1. If D3 is p and p is smaller than 100, M' is equal to 100/p. j=0 and/or 1, the specific value is defined by a standard or configured by the eNB; and G3 is a value of a time gap between initial transmission and retransmission in the SCI 1, and D3 is the number of subframes corresponding to a value of a resource reservation interval field in the SCI x.

If the SCI x received by the UE at a subframe M' is not completely the same as the existing SCI 1, for example, fields contained in the SCI x and the number of bits of each field are the same as those of the SCI 1 but a certain or certain particular bit(s) in reserved bits field are 1, the UE considers that resources indicated by a "positions of frequency resources and the number of contained subchannels" field on subframe m+j×G4+D4 are reserved, j=0 and/or 1, and the specific value is defined by a standard or configured by the eNB; and G4 is a value of a time gap between initial transmission and retransmission in the SCI x, and D4 is the number of subframes corresponding to a value of a resource reservation interval field in the SCI x.

In step 302, if the SCI x is type II, with regard to any one single-subframe resource $R_{x,y}$ in the set S, if there is a variable $j \in \{0, 1, \ldots, C_{resel}-1\}$ that makes a single-subframe resource $$R_{x,y+j \times P_{rsvp\_TX}}$$

overlap with a reserved resource indicated by the SCI x, wherein Cresel represents the number of times that resources are planned to be reserved after UE resource selection or reselection, and $P_{rsvp\_TX}$ represents a resource reservation interval assumed when determining available candidate single-subframe resources which is indicated by the UE high layer, then the UE excludes the single-subframe resource $R_{x,y}$ from S when selecting or reselecting resources. Or, with regard to any one single-subframe resource $R_{x,y}$ in the set S, there is a variable $j \in \{0, 1, \ldots, C_{resel}-1\}$ that makes a single-subframe resource $R_{x,y+j \times P_{rsvp\_TX}}$ overlap with a reserved resource indicated by the SCI x, wherein Cresel overlap with a reserved resource indicated by the SCI x, wherein $P_{rsvp\_TX}$ represents a resource reservation interval assumed when determining available candidate single-subframe resources which is indicated by the UE high layer. If a value $prio_{RX}$ of a priority field contained in the SCI x is greater than a particular value, then the UE excludes the single-subframe resource $R_{x,y}$ from S when selecting or reselecting resources. Or, with regard to any one single-subframe resource $R_{x,y}$ in the set S, there is a variable $j \in \{0, 1, \ldots, C_{resel}-1\}$ in the set S, there is a variable $R_{x,y+j \times P_{rsvp\_TX}}$ overlap with a reserved resource indicated by the SCI x, wherein Cresel represents the number of times that resources are planned to be reserved after UE resource selection or reselection, and $P_{rsvp\_TX}$ represents a resource reservation interval assumed when determining available candidate single-subframe resources which is indicated by UE high layer. If the UE measures PSSCH-RSRP of a PSSCH scheduled by the SCI x, and the value of the measured PSSCH-RSRP is greater than $Th_{prio_{TX}+\Delta,prio_{RX}}$ or $Th_{prio_{TX},prio_{RX}+\Delta}$, wherein $prio_{TX}$ represents a value of a priority field of a PSCCH to be transmitted next indicated by UE high layer, $\Delta$ is a value configured or preconfigured by the eNB, and Thab represents an ith SL-ThresPSSCH-RSRP in SL-ThresPSSCH-RSRP-List-r14 defined in 3GPP standard 36.331 V14.1.0, wherein i=a*8+b+1, then the UE excludes the single-subframe resource $R_{x,y}$ from S in resource selection or reselection.

In this case, if the SCI x is type III, then the UE should measure PSSCH-RSRP of a PSSCH scheduled by the SCI x, with regard to any one single-subframe resource $R_{x,y}$ in the set S, there is a variable $j \in \{0, 1, \ldots, C_{resel}-1\}$ that makes a single-subframe resource $R_{x,y+j \times P_{rsvp\_TX}}$ overlap with a reserved resource indicated by the SCI x, wherein Cresel represents the number of times that resources are planned to be reserved after UE resource selection or reselection, and $P_{rsvp\_TX}$ represents a resource reservation interval assumed when determining available candidate single-subframe resources which is indicated by UE high layer, if the value of the measured PSSCH-RSRP is greater than $Th_{prio_{TX},prio_{RX}}$, wherein $prio_{TX}$ represents a value of a priority field of a PSCCH to be transmitted next indicated by the UE high layer, and $Th_{prio_{TX},prio_{RX}}$ represents an ith SL-ThresPSSCH-RSRP in SL-ThresPSSCH-RSRP-List-r14 defined in 3GPP standard 36.331 V14.1.0, wherein i=$prio_{TX}$*8+$prio_{RX}$+1, then the UE excludes the single-subframe resource $R_{x,y}$ from S in resource selection or reselection.

The UE may further exclude resources in the set S in a manner defined in 3GPP release 14.

The UE randomly selects one single-subframe resource from the remaining resources for data transmission.

In step 303, the UE transmits the PSCCH on a PSCCH resource corresponding to the selected single-subframe resources, and transmits the PSSCH on the selected single-subframe resource.

When transmitting PSCCH, UE working in Mode 3 can set the value of Priority field in PSCCH to a value lower than the priority indicated by high layer. Specifically, if the priority indicated by high layer is pr, the value of Priority field in PSCCH transmitted by UE can be set to pr-$\Delta$, wherein $\Delta$ is a particular value, configured by eNB, defined in standard or preconfigured. In this way, UE working in Mode 3 can be better protected.

Case III

In case III, the SCI x may be type I, type II or type III. If the SCI x received by the UE is type I or type II, then after the UE receives the SCI x, the UE may further measure PSSCH-RSRP of a PSSCH scheduled by the SCI x, and when the UE performs resource selection or reselection, with regard to any one single-subframe resource in a candidate single-subframe resource set S, if it overlaps with a single-subframe resource reserved in the SCI x, then the UE should directly exclude it; or, if it overlaps with a single-subframe resource reserved in the SCI x, and the measured PSSCH-RSRP is greater than a certain particular threshold, then the UE should exclude the single-subframe resource. If the SCI x received by the UE is type III, then after receiving the SCI x, the UE further measures PSSCH-RSRP of a scheduled PSSCH, and when the UE performs resource selection or reselection, with regard to any one single-subframe resource in a candidate single-subframe resource set S, if the single-subframe resource overlaps with a single-subframe resource reserved in the SCI x, and the measured PSSCH-RSRP is greater than a certain particular threshold, then the UE should exclude the single-subframe resource. The steps are as follows:

in step 401, a UE detects SCI x.

In this case, if the SCI x received by the UE at a subframe m is type I, then a method for the UE to determine reserved resources is the same as case I, which will not be described herein anymore. If the SCI x received by the UE at subframe m is type II or type III, then a method for the UE to determine reserved resources is the same as case II, which will not be described herein anymore.

In step 402, if the SCI x is type I, then the UE should exclude single-subframe resources which overlap with reserved resources of the SCI x from the set S according to the method in embodiment I; and if the SCI x is type II or type III, then the UE should exclude single-subframe resources which overlap with reserved resources of the SCI x from the set S according to the method in embodiment II. These will both not be described herein. The UE may further exclude resources in the set S in a manner defined in 3GPP release 14.

The UE randomly selects one single-subframe resource from the remaining resources for data transmission.

In step 403, the UE transmits the PSCCH on a PSCCH resource corresponding to the selected single-subframe resource, and transmits the PSSCH on the selected single-subframe resource.

Case IV

In case IV, a UE works in Mode 3, and SCI x is type II. When the UE receives that resources allocated by eNB signalling have changed, for example, a data generation period or subframe offset indicated by the SCI x has changed, the UE at least performs channel detection on resources or some resources indicated by the eNB, and selects or reselects resources according to a detection result. The steps are as follows:

The UE starts performing channel detection after receiving a sidelink resource allocation indication (i.e. DCI 5A) transmitted by the eNB.

According to implementation I of this case, if a single-subframe resource allocated by the eNB is $R_{x,y}$, then the UE should detect single-subframe resource $R_{x,y+j\times P_{step}}$, wherein Pstep represents a basic resource reservation period in a current resource pool, j=1, 2, 3, . . . I1, the value of I1 is defined by a standard, configured or preconfigured by the eNB, representing a maximum detection period, e.g. I1=10 or 1, or 5.

According to implementation II of this case, if a single-subframe resource allocated by the eNB is $R_{x,y}$, then the UE should detect single-subframe resource $R_{x,y+j\times P_{rsvp\_TX}}$, wherein j=1, 2, 3, . . . I2, the value of I2 is defined by a standard, configured or preconfigured by the eNB, representing a maximum detection period, e.g. I2=10, or 1, or 5, wherein Prsvp_TX is a current resource reservation period of the UE, and this value is indicated by the eNB.

According to implementation III of this case, if a single-subframe resource allocated by the eNB is $R_{x,y}$, then the UE should detect single-subframe resource $R_{x,y+j\times Pm}$, wherein j=1, 2, 3, . . . I3, the value of I3 is defined by a standard, configured or preconfigured by the eNB, representing a maximum detection period, e.g. I2=10, or 1, or 5; and Pm is a minimum resource reservation period supported in the current resource pool.

According to implementation IV of this case, if a single-subframe resource allocated by the eNB is $R_{x,y}$, then the UE should detect subframe y. The UE receives the SCI x at subframe y and resources scheduled or reserved by the SCI x overlap with $$R_{x,y+j\times P_{rsvp\_TX}},$$

j=1, 2, 3, . . . , and PSSCH-RSRP of the resources scheduled by the SCI x exceed a threshold, then the resource $$R_{x,y+j\times P_{rsvp\_TX}}$$

are unavailable. Or, the UE may also determine whether the resource $$R_{x,y+j\times P_{rsvp\_TX}}$$

is available by measuring S-RSSI based on subframe y and comparing the same with a particular threshold. The above particular threshold is defined by a standard, configured or preconfigured by the eNB, wherein Prsvp_TX is a current resource reservation period of the UE, and indicated by the eNB.

According to implementation V of this embodiment, if a single-subframe resource allocated by the eNB is $R_{x,y}$, then the UE should detect a subframe before subframe $y+I_4\times P_{rsvp\_TX}$, the value of I4 defined by a standard, configured or preconfigured by the eNB, representing a maximum detection period, e.g. I4=10, or 1, or 5, so as to determine whether resource $$R_{x,y+I_4\times P_{rsvp\_TX}+j\times P_{rsvp\_TX}},$$

j=0, 1, 2, . . . is available. If the SCI x is received and resources scheduled or reserved by the SCI x overlap with $$R_{x,y+I_4\times P_{rsvp\_TX}+j\times P_{rsvp\_TX}},$$

and PSSCH-RSRP of the resource scheduled by the SCI x exceeds a threshold, then the resource $$R_{x,y+I_4\times P_{rsvp\_TX}+j\times P_{rsvp\_TX}}$$

is unavailable. Or, the UE may also determine whether the resource $$R_{x,y+I_4 \times P_{rsvp\_TX} + j \times P_{rsvp\_TX}}$$

is available by measuring S-RSSI based on that before subframe $y+I_4 \times P_{rsvp\_TX}$ and comparing the same with a particular threshold. For example, with regard to $P_{rsvp\_TX}=k \times P_{step}$, k=1, ½, ⅕, S-RSSI is an average value of S-RRSIs measured on resource $R_{x,y+k \times P_{rsvp\_TX}}$, j=0, 1, 전 I4-1; and with regard to $P_{rsvp\_TX}=k \times P_{step}$ k>1, S-RSSI is an average value of S-RRSIs measured on the resource $R_{x,y+k \times P_{step}}$, j=0, 1, . . . $(I_4 \times P_{rsvp\_TX})/P_{step}-1$. The above particular threshold is defined by a standard, configured or preconfigured by the eNB, wherein Prsvp_TX is a current resource reservation period of the UE, and this value is indicated by the eNB.

According to implementation VI of this embodiment, when a UE anticipates that a base station is to change a period of a configured SPS resource or a subframe offset, the UE starts performing a detection operation. For example, the UE transmits information about a service change to the base station, for example, a period change, or a change of subframe offset generated within the period, etc.; or the base station transmits indication information to the UE, notifying the UE that the period of the SPS resource or subframe offset is to be changed. After the UE receives SCI x of the base station, assuming that single-subframe resource allocated by an eNB is $R_{x,y}$, the UE detects a subframe before a subframe y and determines whether resource $$R_{x,y+j \times P_{rsvp\_TX}},$$

j=1, 2, . . . is available. With regard to any one value of j in the above value range of j, f the SCI x is received and resources scheduled or reserved by the SCI x overlap with $$R_{x,y+j \times P_{rsvp\_TX}},$$

and PSSCH-RSRP of the resources scheduled by the SCI x exceeds a threshold, then the resource $$R_{x,y+j \times P_{rsvp\_TX}}$$

is available by measuring S-RSSI based on that before subframe y comparing the same with a particular threshold. For example, with regard to $P_{rsvp\_TX}=k \times P_{step}$, k=1, ½, ⅕, S-RSSI is an average value of S-RRSIs measured on the resource $R_{x,y-k \times P_{step}}$, j=0, 1, . . . ; and with regard to $P_{rsvp\_TX}=k \times P_{step}$, k>1, S-RSSI is an average value of S-RRSIs measured on the resource $R_{x,y-k \times P_{step}}$, j=0, 1 . . . The above particular threshold is defined by a standard, configured or preconfigured by the eNB, wherein Prsvp_TX is a current resource reservation period of the UE, and this value is indicated by the eNB.

In order to support the above operations, the UE should continuously perform channel detection on all resources of each subframe in a currently selected transmitting resource pool, or start performing channel detection when a UE data generation period changes, and report the channel detection result to the eNB. Preferably, if the subframe n satisfies at least one of the following conditions, the UE reports the channel detection result to the eNB in subframe n:

Condition 1: The UE satisfies bypass Buffer Status Report (BSR) condition in subframe n, and the service corresponding to the bypass BSR is a V2X service that the UE intends to send in the current resource pool.

Condition 2: the subframe n satisfies the channel detection result reporting configuration indicated by the eNB, that is, (n-Δ) mod P=0, where Δ is the channel detection result reporting subframe offset indicated by the eNB, P is the channel detection result reporting period, the UE determines the value of P according to the eNB indication, pre-configuration or standard definition.

Condition 3: subframe n is the first subframe in which there is uplink scheduling resource for UE after subframe x, where subframe x is the latest subframe in which the UE receives an indication of channel detection result reporting of the eNB. The indication of channel detection result reporting of the eNB may be RRC layer signaling, MAC layer signaling or physical layer signaling.

Preferably, the channel detection result reported by the UE should include channel conditions on part or all of the subchannels in the subframe range [n+a, n+b], and for any one of the reported subchannels, its channel conditions include at least one item of the following information: average S-RSSI on the sub-channel, PSSCH-RSRP on the sub-channel, the priority of PSSCH sent by the UE that reserves the sub-channel, the resource reservation period of the UE that reserves the sub-channel, and the like. For example, if UE reporting the channel detection result is triggered by the condition 1, the values of a and b are determined by the UE implementation, and the value of b should meet the delay requirement of the current service of the UE; if the UE reporting the channel detection result is triggered by condition 2 or condition 3, then a=1, b=100. Because the gap between the subframe where the eNB sends DCI 5A and the subframe indicated by DCI 5A where PSCCH and PSSCH resource are located should be at least 4 ms, preferably, if UE reporting the channel detection result is triggered by Condition 2 or Condition 3, in order to provide timely channel detection result to eNB, the period P the UE reports the channel detection result should be less than b. For example, if b is 100, and the channel detection result is fed back by the physical layer signaling, the value of P should not be greater than 96. If b is 100, and the channel detection result is fed back by the higher layer signaling, the value of P should not be greater than X, where X is less than 96, such as X=95 or 94.

Preferably, when reporting the channel detection result, the UE should further report the global positioning system (GPS) coordinates of the current location.

If the channel detection mode is implementation I, and it is not found that the UE occupies single-subframe resources $R_{x,y+k \times P_{step}}$, j=1, 2, 3, . . . , I1, in I1 detections, then the UE takes single-subframe resources $R_{x,y+I1 \times Pstep + k \times Pstep}$, k=1, 2, . . . , as transmitting resources for data transmission.

If the channel detection mode is implementation II, and it is not found that the UE occupies single-subframe resources $R_{x,y+j \times P_{rsvp\_TX}}$, j=1, 2, 3, . . . I2, in I2 detections, then the UE takes single-subframe resource $$R_{x,y+I2 \times P_{rsvp\_TX} + k \times P_{rsvp\_TX}},$$

k=1, 2, . . . , as transmitting resources for data transmission.

If the channel detection mode is implementation III, and single-subframe resources $R_{x,y+j\times Pm}$, j=1, 2, 3, ... I3, are not occupied by other UEs, then the UE determines single-subframe resources $R_{x,y+I3\times Pm+k\times Pm}$, k=1, 2, ..., as transmitting resources for data transmission.

If the channel detection mode is implementation IV, and single-subframe resource $R_{x,y}$, k=1, 2, ..., as transmitting resources for data transmission.

If the channel detection mode is implementation IV, and single-subframe resource $$R_{x,y+j\times P_{rsvp\_TX}},$$

j=1, 2, 3, ..., as transmitting resources for data transmission.

If the channel detection mode is implementation V, and single-subframe resources $$R_{x,y+I_4\times P_{rsvp\_TX}+j\times P_{rsvp\_TX}},$$

j=0, 1, 2, ..., are not occupied by other UEs, then the UE selects single-subframe resources $$R_{x,y+I_4\times P_{rsvp\_TX}+j\times P_{rsvp\_TX}},$$

as transmitting resources for data transmission.

If the channel detection mode is implementation VI, and single-subframe resource $R_{x,y}$ is not occupied by other UEs, then the UE selects single-subframe resource $$R_{x,y+j\times P_{rsvp\_TX}},$$

j=1, 2, 3, ..., as transmitting resources for data transmission.

The UE transmits the PSCCH on a PSCCH resource corresponding to the selected single-subframe resources, and transmits the PSSCH on the selected single-subframe resources.

Case V

In Case V, the UE operates in Mode 3. Under certain condition, the UE reports the channel detection result of the current resource pool to the eNB to assist the eNB in resource allocation. The UE working in Mode 3 performs a receiving operation on a resource pool, for example, receiving V2X information and measured CBR from other UE(s), and therefore, the UE may observe traffic distribution on the resource pool, so that the UE may know which resources are relatively busy, and which resources are relatively idle in the resource pool. Therefore, the UE in Mode 3 may report information on traffic distribution in resource pool to the base station, so as to facilitate the base station scheduling data transmission of the UE in Mode 3 on relatively idle resources, thereby reducing the impact on users in Mode 4. For example, the above information on traffic distribution in resource pool may indicate an idle resource period and subframe offset. The present disclosure does not limit the specific method for indicating information on traffic distribution in resource pool. After receiving the bypass resource allocation indication (that is, DCI 5A) sent by the eNB, the UE sends PSCCH and PSSCH directly on the resource indicated by DCI 5A or the UE determines sending resource according to the method described in Case IV.

Preferably, a method for the UE assisting the base station to perform resource allocation of mode 3 by reporting the detection result is described below. Steps are as follows:

At the first step, if the subframe n satisfies at least one of the following conditions, the UE reports the channel detection result to the eNB in subframe n:

Condition 1: The UE satisfies bypass Buffer Status Report (BSR) condition in subframe n, and the service corresponding to the bypass BSR is a V2X service that the UE intends to send in the current resource pool.

Condition 2: the subframe n satisfies the channel detection result reporting configuration indicated by the eNB, that is, (n-Δ) mod P=0, where Δ is the channel detection result reporting subframe offset indicated by the eNB, P is the channel detection result reporting period, the UE determines the value of P according to the eNB indication, pre-configuration or standard definition.

Condition 3: subframe n is the first subframe in which there is uplink scheduling resource for UE after subframe x, where subframe x is the latest subframe in which the UE receives an indication of channel detection result reporting of the eNB. The indication of channel detection result reporting of the eNB may be RRC layer signaling, MAC layer signaling or physical layer signaling.

Preferably, the channel detection result reported by the UE should include channel conditions on part or all of the subchannels in the subframe range [n+a, n+b], and for any one of the reported subchannels, its channel conditions include at least one item of the following information: average S-RSSI on the sub-channel, PSSCH-RSRP on the sub-channel, the priority of PSSCH sent by the UE that reserves the sub-channel, the resource reservation period of the UE that reserves the sub-channel, and the like. For example, if UE reporting the channel detection result is triggered by the condition 1, the values of a and b are determined by the UE implementation, and the value of b should meet the delay requirement of the current service of the UE; if the UE reporting the channel detection result is triggered by condition 2 or condition 3, then a=1, b=100. Because the gap between the subframe where the eNB sends DCI 5A and the subframe indicated by DCI 5A where PSCCH and PSSCH resource are located should be at least 4 ms, preferably, if UE reporting the channel detection result is triggered by Condition 2 or Condition 3, in order to provide timely channel detection result to eNB, the period P the UE reports the channel detection result should be less than b. For example, if b is 100, and the channel detection result is fed back by the physical layer signaling, the value of P should not be greater than 96. If b is 100, and the channel detection result is fed back by the higher layer signaling, the value of P should not be greater than X, where X is less than 96, such as X=95 or 94.

Preferably, when reporting the channel detection result, the UE should further report the global positioning system (GPS) coordinates of the current location.

At the second step, the UE sends PSCCH and PSSCH on the resource indicated by DCI 5A or on the transmission resource determined according to the method in Case IV after receiving bypass resource allocation indication (that is, DCI 5A) sent by the eNB.

Through the above method, the UE working in Mode 3 determines the resource occupation and the resource reservation in the current resource pool by channel detection. After the UE reports the detection result to the eNB, the eNB may schedule the resource with a relatively high channel quality to the UE in Mode 3 for data transmission, thereby reducing the interference between user in Mode 3 and user in Mode 4.

Figure 2:
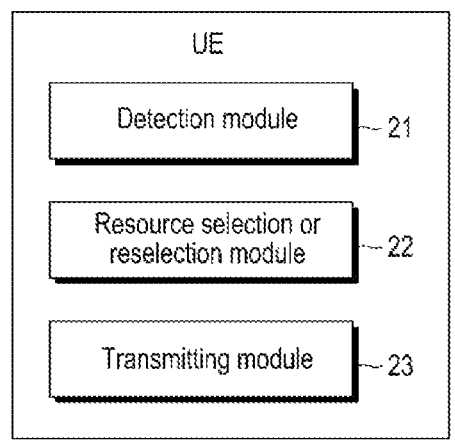
FIG. 2 is a block diagram of user equipment (UE) which performs a resource selection or reselection method in V2X communication according to an embodiment of the present disclosure.

FIG. 2 is a block diagram of user equipment (UE) which performs a resource selection or reselection method in vehicle to vehicle/pedestrian/infrastructure/network or Vehicle to Everything (V2X) communication according to an embodiment of the present disclosure. Referring to FIG. 2, the equipment comprises: a detection module 21, a resource selection or reselection module 22 and a transmitting module 23.

The detection module is used for detecting PSCCH transmitted by other UEs. The detection module may detect the SCI x on all PSCCH resources in a transmitting resource pool currently selected by the UE, or only detect the SCI x on some PSCCH resources in the transmitting resource pool currently selected by the UE, for example, positions of the some PSCCH resources determined by receiving signalling of an eNB.

The resource selection or reselection module is configured to select single-subframe resources from single-subframe resources which do not overlap with single-subframe resources reserved by the detected PSCCH.

According to one embodiment of the present disclosure, if the detected SCI x is in a particular format, then single-subframe resources are selected from single-subframe resources which do not overlap with single-subframe resources reserved by the detected PSCCH.

According to another embodiment of the present disclosure, if the detected SCI x is in a particular PSCCH format, and a value $prio_{RX}$ of a priority field contained in the SCI x is greater than a particular value, then single-subframe resources are selected from single-subframe resources which do not overlap with single-subframe resources reserved by the detected PSCCH.

For example, the particular PSCCH format is SCI 1 defined in 3GPP release 14, or a PSCCH format different from the SCI 1 defined in 3GPP release 14, or a format which has the same number of bits as the SCI 1 defined in 3GPP release 14, and the meaning of each field is the same, but one or more bits in reserved bits field are 1.

According to yet another embodiment of the present disclosure, the resource selection or reselection module further measures sidelink reference signal received power of a PSSCH (PSSCH-RSRP) scheduled by SCI x, if the PSSCH-RSRP is higher than a particular threshold, then single-subframe resources are selected from single-subframe resources which do not overlap with single-subframe resources reserved by the detected PSCCH.

The transmitting module transmits physical sidelink shared channel (PSSCH) on the selected single-subframe resources.

In the following, unless specifically explained, the first UE refers to a UE which performs the channel detection and resource selection or reselection, and the second UE refers to the UE detected by the first UE. In embodiments of the present disclosure, a slot refers to a minimum time unit for the first UE to transmit PSSCH. In other words, the minimum time unit that the first UE transmits the PSSCH is referred to as a slot. This slot does not refer to the time resource size in the LTE system. A physical resource block (PRB) refers to a minimum frequency unit for the first UE to transmit PSSCH, i.e., the minimum frequency unit that the first UE transmits the PSSCH is referred to as a PRB, which is not the resource block size in the LTE.

Figure 3:
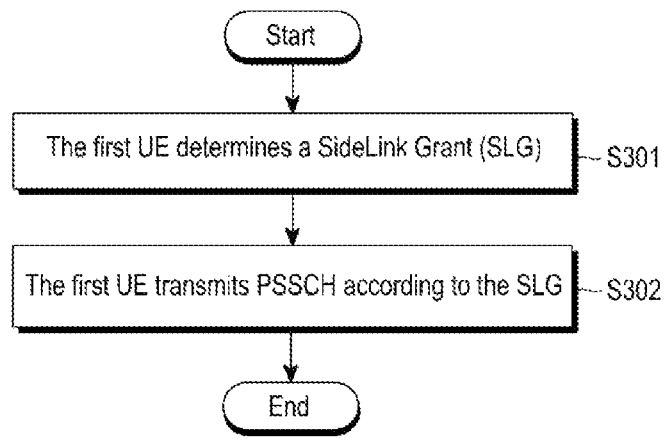
FIG. 3 is a flowchart illustrating a resource allocation according to some embodiments of the present disclosure.

In current LTE-based V2X communication systems, since both the lowest data transmission delay and the highest transmission reliability cannot meet the requirements of V2X application scenarios newly defined by 3GPP, the V2X communication mechanism needs to be improved, so as to increase the data transmission reliability on the premise of ensuring a lower data transmission delay, thereby meeting the requirement of the newly defined V2X application scenarios. Therefore, various embodiments of the present disclosure provide a sidelink resource allocation method capable of ensuring low delay and high reliability. As shown in FIG. 3, the method includes the following.

In step S301, a first UE determines a SideLink Grant (SLG).

In embodiments of the present disclosure, the SLG of the first UE includes information such as position information of M PSSCH transmission resources, modulation and coding scheme for transmitting a Transmission Block (TB), etc. The M PSSCH transmission resources are used for M times of transmission of one TB, M is a specified value and may be defined by specifications, or configured by eNB or configured in advance. If the first UE is able to occupy multiple time-frequency resources of one SLG semi-persistently with a certain period, the SLG may further includes the length of the period for the semi-persistent occupation.

The first UE may determine the time-frequency position information of the multiple PSSCHs for the multiple times of transmission of one TB in the SLG through receiving one or more downlink control signaling of the base station, or the first UE may determine the time-frequency position information of the multiple PSSCHs through channel detection. The time-frequency resources of the multiple PSSCHs may have a predefined binding relationship. In this case, the group of PSSCH time-frequency resources with the binding relationship is called a PSSCH resource pattern.

If there is no predefined binding relationship between the PSSCH time-frequency resources and the PSCCH resources scheduling the PSSCH, when the first UE determines the SLG through receiving the one or more downlink control signaling of the base station, the one or more downlink control signaling of the base station shall further indicate the PSCCH transmission resources, when the first UE determines the SLG via channel detection, the first UE selects one PSCCH transmission resource according to a channel detection result.

The modulation and coding scheme for transmitting the TB may be determined according to information such as priority of the data to be transmitted by the UE, moving speed, carrier frequency and current channel busy condition, etc.

In step S302, the first UE transmits the PSSCH according to the SLG.

The PSSCH is scheduled by the transmitted PSCCH.

In embodiments of the present disclosure, the PSCCH and the PSSCH scheduled by the PSCCH may be transmitted in a time division manner, e.g., transmitted on different symbols of the same slot, or transmitted in different slots. In addition, the PSCCH and the PSSCH scheduled by the PSCCH may also be transmitted in a frequency division manner, e.g., transmitted on different physical resource blocks (PRBs) of the same slot. There may be a binding relationship between the time-frequency resources of the PSSCH and the resources of the PSCCH scheduling the PSSCH, e.g., it may be predefined that the first PRB in the PSSCH transmission resources is used for transmitting the PSCCH.

For facilitating the understanding of the present disclosure, the above technical solution is described with reference to some detailed application scenarios.

Embodiment 1

In this embodiment, the first UE determines the position information of multiple PSSCH time-frequency resources in the SLG through receiving one or more downlink control signaling of the base station, and there is no binding relationship between the multiple PSSCH time-frequency resources contained in the SLG.

Hereinafter, the resource allocation manner provided by this embodiment is described with reference to two situations.

Determining the SLG via one downlink control signaling

If the first UE determines the SLG through receiving one downlink control signaling of the base station, the downlink control signaling should include the position of multiple PSSCH time-frequency resources used for M times of transmissions of one TB. In particular, the downlink control signaling includes at least the following information:

positions of slots where the time-frequency resources used for the second time till the M-th time transmission are located;

frequency-domain positions of the time-frequency resources used for each time transmission and the number of frequency-domain resources contained in the time-frequency resources for each time transmission; wherein the frequency positions of the time-frequency resources for the M times of transmission may be different, but the number of frequency-domain resources contained in the time-frequency resources for the M times of transmission is the same.

In this situation, if the first UE receives the downlink control signaling in slot n1, the first slot which is after slot n1+k and belonging to the current resource pool of the first UE is the slot where the resource for first time transmission in the SLG is located, wherein k is a specified integer and is determined according to the processing capability of the first UE and the slot configuration of the current carrier. The first UE may determine the value of k according to configuration of the base station or definition of the specifications. The first UE determines configuration of the resource pool according to signaling of the base station. The SLG further indicates positions of the slots where time-frequency resources for the other M−1 times of transmission are located. For example, $\lceil \log_2 C_T^{M-1} \rceil$ bits in the SLG indicate the positions of slots wherein the time-frequency resources for the second time till the M-th time transmission are located, the positions indicate M−1 slots within slots [n1+k+1, n1+k+T], wherein T is a specified value configured by the base station or defined by specifications.

II. Determining the SLG Through Multiple Downlink Control Signaling.

If the first UE determines the SLG through receiving multiple downlink control signaling of the base station, each downlink control signaling should include positions of PSSCH time-frequency resources used for N times of transmission of one TB, wherein N≤M, e.g. N=1 or 2. In this situation, if the UE receives downlink control signaling A in slot n2, the first PSSCH transmission resource indicated by the downlink control signaling A is located in slot n2+k. In some embodiments, each downlink control signaling includes a downlink control signaling index, the index is within [0, I/N−1], the PSSCH transmission resources indicated by the continuous M/N downlink control signaling indexed from 0 to M/N−1 form an SLG.

In addition, after determining the SLG and before transmitting the PSCCH and the PSSCH, in some embodiments, an occupation manner of the time-frequency resources in the SLG may be determined. For example, the occupation manner may be semi-persistent occupation with a predefined time interval or one-time occupation. Thus, the first UE may semi-persistently occupy the time-frequency resources in the SLG with the time interval predefined by the base station. The first UE may receive the high-layer signaling (RRC layer signaling) of the base station to determine the time interval. Or, the first UE may determine the time interval according to the one or more downlink control signaling indicating the SLG. Or, the first UE may occupy the time-frequency resources in the SLG only once, i.e., only transmit the PSSCH using the time-frequency resources in the SLG for one time.

As to the occupation manner of the time-frequency resources, the first UE may indicate it via the one or more downlink control signaling indicating the SLG. The first UE determines whether the resources in the SLG can be semi-persistently occupied or can be occupied one time according to the corresponding downlink control signaling. For example, the downlink control signaling indicating semi-persistent occupation and one-time occupation may adopt different scrambling sequences. The first UE determines the scrambling sequence used by the downlink control signaling via blind detection, and then determines the type of the SLG (semi-persistent occupation or one-time occupation).

In this embodiment, the PSCCH transmitted by the UE may indicate only the time-frequency resource position of the currently scheduled PSSCH, or indicate the position of the currently scheduled PSSCH and the next PSSCH transmission, or indicate the position of M PSSCH transmission resources for transmitting one TB at the same time.

Embodiment 2

In this embodiment, there is a binding relationship between the multiple PSSCH time-frequency resources contained in the SLG, i.e. there is a predefined PSSCH resource pattern. The first UE determines the resource pattern of the SLG through receiving control signaling of the base station.

In some embodiments, the resource pattern may be defined as M PSSCH transmission resource units across a time period T and a frequency range F (referred to as a resource pattern space), it repeats each time period T, the first PSSCH transmission resource unit and the last PSSCH transmission resource unit contained in one resource pattern have a time-domain gap less than or equal to the sum of a maximum tolerated delay for the data transmission of the first UE and the time required for coding the PSSCH. Within one resource pattern space, each resource pattern corresponds to a unique resource pattern index. Furthermore, there is at least one slot position difference between the PSSCH transmission resources of any two resource patterns. In this embodiment, the first UE may determine the resource pattern space through receiving the signaling of the base station.

Figure 4:
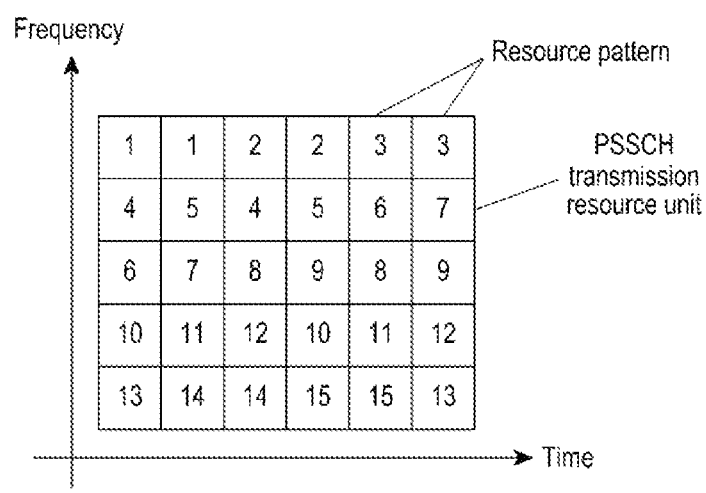
FIG. 4 is a schematic diagram illustrating a resource pattern according to some embodiments of the present disclosure.

FIG. 4 provides a possible resource pattern. As shown in FIG. 4, the pattern controls 6 slots in time and 5 PSSCH transmission resource units in frequency, M=2. In this embodiment, the resource pattern index $$r = \sum_{t=0}^{M-1} \binom{T-n_t}{M-t},$$

wherein $n_t \in [1, T]$, denoting a time-domain index of the t-th PSSCH transmission resource unit in the pattern space. For a resource pattern with index r, the frequency-domain indexes of its PSSCH transmission resources are $$m_j = \sum_{\substack{i=0 \\ i \neq j}}^{M-1} \binom{T - n_i - \delta}{M - i - \delta},$$

$$\delta = \begin{cases} 1 & n_i < n_j \\ 0 & \text{others} \end{cases}, j \in [0, M-1], m_j \in [0, F-1].$$

According to the relationship between the time-domain and frequency-domain indexes and the resource pattern index and the resource pattern index r, it is possible to determine a unique resource pattern in the resource pattern space.

In this embodiment, the downlink control signaling of the base station may include the resource pattern index r of the resource pattern of the SLG, if the first UE receives the downlink control signaling of the base station in slot n3, the first UE determines the first resource pattern with index r after slot n3+k as the allocated SLG resources.

Similarly as embodiment 1, the first UE may determine the occupation manner of the resources in the SLG, e.g., semi-persistent occupation or one-time occupation. In particular, the first UE may semi-persistently occupy the time-frequency resources in the SLG with the time interval predefined by the base station. The first UE may receive the high-layer signaling (RRC layer signaling) of the base station to determine the time interval. Or, the first UE may determine the time interval according to the one or more downlink control signaling indicating the SLG. In some embodiments, the time interval is an integer times of the resource pattern space periodicity T. Or, the first UE may occupy the time-frequency resources in the SLG only once, i.e., only transmit the PSSCH using the time-frequency resources in the SLG for one time. The first UE determines whether the resources in the SLG can be semi-persistently occupied or can be occupied one time according to the one or more downlink control signaling indicating the SLG. For example, the downlink control signaling indicating semi-persistent occupation and one-time occupation may adopt different scrambling sequences. The first UE determines the scrambling sequence used by the downlink control signaling via blind detection, and then determines the type of the SLG (semi-persistent occupation or one-time occupation).

In this embodiment, the PSCCH transmitted by the UE may indicate the resource pattern index for the PSSCH scheduled by the PSCCH, via an explicit or implicit manner. For example, there is a fixed mapping relationship between positions of the PSCCH frequency resources and the positions of the RBs occupied by the PSSCH transmission resource pattern in the current slot. Thus, the index of the resource pattern may be implicitly indicated by the frequency resource index of the PSCCH.

Embodiment 3

In this embodiment, the first UE determines position information of multiple PSSCH time-frequency resources in the SLG through channel detection. There is no binding relationship between the multiple PSSCH time-frequency resources contained in the SLG.

Figure 5:
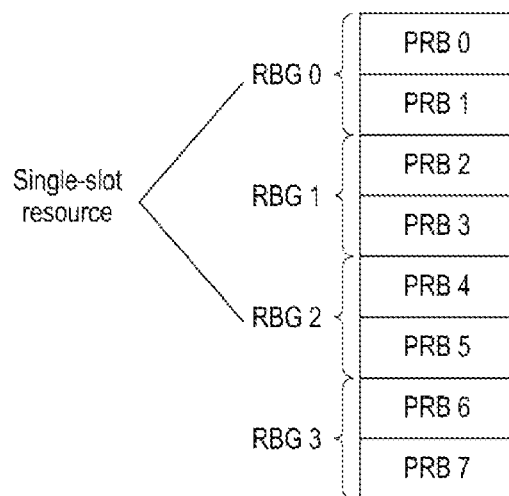
FIG. 5 is a schematic diagram illustrating a single-slot resource consisting of RBGs according to some embodiments of the present disclosure.
Figure 6:
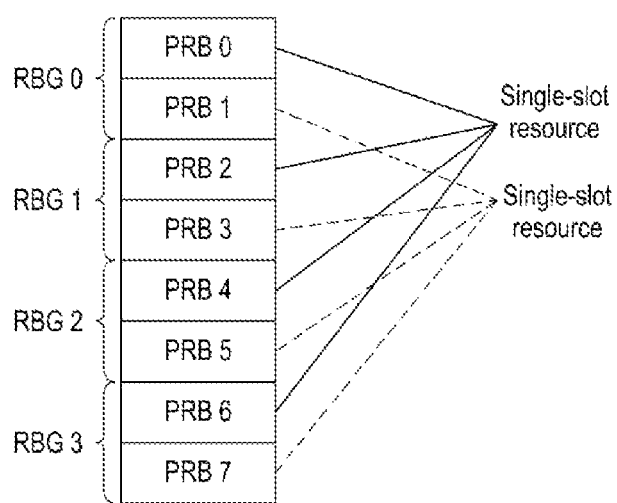
FIG. 6 is a schematic diagram illustrating single-slot resources consisting of PRBs with specified indexes in RBGs according to some embodiments of the present disclosure.

Suppose that the first UE performs SLG determination operation in slot n4. If PRB group (RBG) is configured, and the RBG is taken as a resource allocation unit (i.e., downlink resource allocation manner 0 defined in current LTE specifications), the first UE regards LRBG RBGs in any slot belonging to the current resource pool of the first UE and within [n4+T1, n4+T2] as a candidate single-slot resource, as shown in FIG. 5, referred to as single-slot resource format 0 hereinafter. If RBG is configured, and the RBG is taken as a resource allocation unit, but in each RBG only one PRB with the same index can be allocated (i.e. the downlink resource allocation manner 1 defined in current LTE specifications), the first UE regards the i-th PRB in $\tilde{L}_{RBG}$ RBGs in any slot which is belonging to the current resource pool of the first UE and within [n4+T1, n4+T2] as a candidate single-slot resource, i=1, 2, ..., NRBG, NRBG denotes the number of PRBs in one RBG, as shown in FIG. 6, hereinafter referred to as single-slot resource format 1. If RBG is not configured, the first UE takes LRB PRBs in any slot which is belonging to the current resource pool of the first UE and within [n4+T1, n4+T2] as a candidate single-slot resource, hereinafter referred to as single-slot resource format 2. The values of T1 and T2 are determined according to implementation of the UE. [n4+T1, n4+T2] is referred to as a resource selection window, LRBG, $\tilde{L}_{RBG}$, or LRB are determined by higher layer of the first UE, e.g., MAC layer of the first UE. The total number of single-slot resources in the resource selection window is denoted by Mtotal, Mtotal candidate single-slot resources constitute a set S.

Hereinafter, the detailed procedure for determining the SLG based on channel detection in this embodiment of the present disclosure is described.

Suppose that the PSSCH and the PSCCH scheduling the PSSCH are transmitted in the same slot, and a second UE semi-persistently occupies each PSSCH transmission resource with a predefined time interval, the first UE may detect in slots in a channel detection window before slot n4, wherein the channel detection window is defined by specifications, e.g., slots n4-1000, n4-999, ..., n4-1 may be defined as the channel detection window. For any slot detected by the first UE, the first UE decodes the PSCCH in the slot, determines the number of successfully decoded PSCCH in each slot, and measures a reference signal receiving power of the scheduled PSSCH, priority of data transmitted on the PSSCH and resource reservation interval for the PSSCH transmission resources according to the decoded PSCCH. In addition, in each detected slot, an average receiving energy of each RBG or each RB in the slot may be measured. In particular, for the single-slot resource format 0, the first UE measures the average receiving energy of each RBG in the detected slot. For the single-slot resource format 1 or single-slot resource format 2, the first UE measures the average receiving energy of each RB in the detected slot.

The first UE estimates, according to a measurement result in the channel detection window, the number of second UEs which may perform PSCCH transmission in each candidate slot in the resource selection window, the PSSCH reference signal receiving power on the candidate single-slot resource, and the average receiving energy of each RB or each RBG. The estimation may be performed similarly as a conventional method, which is described in the following.

The first UE may estimate the number of second UEs which may transmit PSCCH in each candidate slot in the resource selection window as follows: for any slot in the resource selection window, if the first UE successfully detects PSCCH in slot y in the channel detection window, and the PSCCH indicates a resource reservation interval p and y+p=x, the first UE regards that the second UE which transmits the PSCCH will also transmit PSCCH in slot x.

The first UE may estimate the PSSCH reference signal receiving power on a candidate single-slot resource in the resource selection window as follows: if the first UE successfully detects the PSCCH in slot y of the channel detection window, and measures the reference signal receiving power of the PSSCH scheduled by the PSCCH, suppose that the PSCCH indicates a resource reservation interval p and slot y+p still belongs to the resource selection window, the first UE regards that the second UE which transmits the PSSCH will also transmit PSSCH on the same frequency position in slot y+p, and the reference signal receiving power of the PSSCH is the same.

The first UE may estimate the average receiving power of each RB or each RBG in the resource selection window as follows: for any RB or RBG in any slot x in the resource selection window, the first UE regards that an average value of the receiving energies measured on the same RB or RBG in slots x-j*Pm as the average receiving energy of the RB or the RBG in the slot x. Pm denotes a measurement interval, it may be defined by specifications, or configured by the eNB or preconfigured, e.g., Pm is 100, or equal to a reservation interval for the data to be transmitted by the first UE, or equal to a minimum resource reservation interval allowed by the current resource pool; j includes all positive integers which make x-j*Pm belonging to the channel detection window.

Then, the first UE selects from set S, according to the above estimation result, M single-slot resources in which the second UE occupies relatively less resources to determine the SLG. The selection may be configured according to a practical requirement. The principle for selecting the M single-slot resources is to select those with fewer resources occupied by other UEs as much as possible. As such, the data of the first UE may have a little probability to collide with other UEs and lost, and the data transmission reliability may be increased. In particular, M single-slot resources on which resources occupied by the second UE is lower than a defined requirement may be selected. Herein, the defined requirement may be either an explicit requirement, or a requirement implicitly generated based on the selection of the M single-slot resources. In addition, the second UE may be not a single one, but include multiple UEs detected by the first UE. Hereinafter, one selection manner is provided.

In particular, the first UE may select M single-slot resources located in different slots from set S to determine the SLG according to one of the following steps:

The first UE selects X % slots with minimum number of successfully decoded PSCCH in the resource selection window as candidate slots;

The first UE excludes single-slot resources with PSSCH reference signal power higher than a specified threshold from the single-slot resources of the candidate slots according to the PSSCH reference signal receiving power and the priority of the data transmitted by the PSSCH, the specified threshold is relevant to the priority of the data transmitted by the PSSCH and the priority of the data to be transmitted by the first UE.

The first UE sorts, after some single-slot resources are excluded through step 2, the remaining single-slot resources of the candidate slots according to their receiving energies, selects M single-slot resources located in different slots from Y % single-slot resources with lowest receiving energy, and takes the selected M single-slot resources as the M PSSCH transmission resources of the SLG; wherein when selecting the M single-slot resources from the Y % single-slot resources with lowest receiving energy, the selection may be performed according to a requirement, e.g., randomly select with equal probability.

X and Y are both specified values, which may be configured by the base station, preconfigured or defined by specifications. The selected M single-slot resources are located in different slots.

The first UE may semi-persistently occupy the time-frequency resources of the SLG with a specified interval. The specified interval may be determined by a higher layer of the UE (e.g., MAC layer of the UE). In this embodiment, the PSCCH transmitted by the UE may indicate merely the time-frequency resource positions of the currently scheduled PSSCH, or indicate the resource positions of both the currently scheduled PSSCH and a next PSSCH, or indicate the positions of M PSSCH transmission resources used for one TB transmission at the same time.

Embodiment 4

In this embodiment, there is a binding relationship between the multiple PSSCH time-frequency resources contained in the SLG, i.e., a PSSCH resource pattern is predefined. The first UE determines the resource pattern in the SLG by channel detection.

In some embodiments, the resource pattern may be defined as M PSSCH transmission resource units across a time period T and a frequency range F (referred to as a resource pattern space), it repeats each time period T, the first PSSCH transmission resource unit and the last PSSCH transmission resource unit contained in one resource pattern have a time-domain gap less than or equal to the sum of a maximum tolerated delay for the data transmission of the first UE and the time required for coding the PSSCH. Within one resource pattern space, each resource pattern corresponds to a unique resource pattern index. Furthermore, there is at least one slot position difference between the PSSCH transmission resources of any two resource patterns. In this embodiment, the first UE may determine the resource pattern space through receiving the signaling of the base station.

Figure 7:
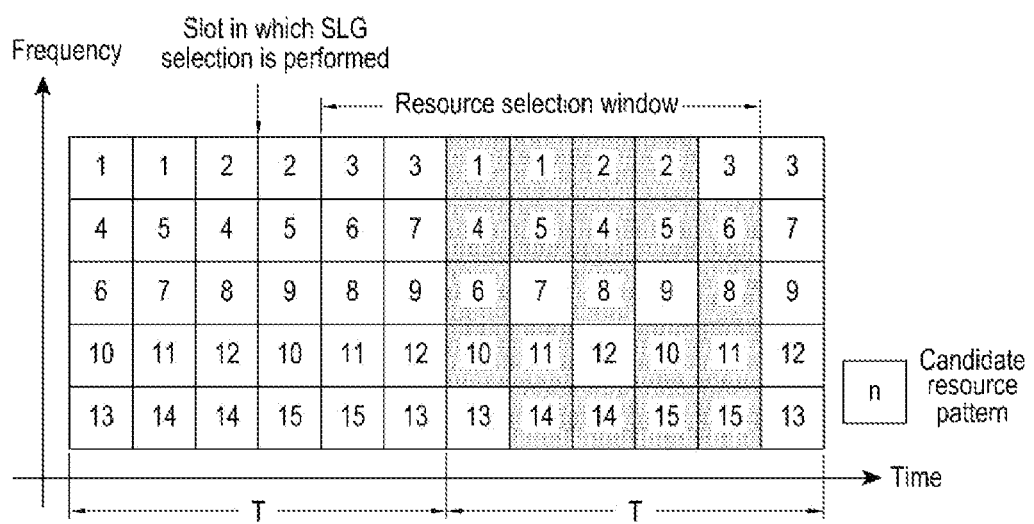
FIG. 7 is a schematic diagram illustrating a candidate resource pattern in a specific resource selection window according to some embodiments of the present disclosure.

Suppose that the first UE performs the SLG determination operation in slot n4, then the first UE should regard any resource pattern whose starting subframe and ending subframe are both located within slots [n4+T1, n4+T2] as a candidate resource pattern, as shown in FIG. 7. The values of T1 and T2 are determined according to implementation of the UE. [n4+T1, n4+T2] is referred to as a resource selection window. The total number of candidate resource patterns in the resource selection window is denoted by $M_{total}^P$, $M_{total}^P$ candidate resource patterns form a set SP.

Hereinafter, the procedure of determining the SLG according to the channel detection in this embodiment is described.

Suppose that the second UE semi-persistently occupies a resource pattern with a specified time interval, the first UE may detect in slots in the channel detection window before slot n4, wherein the channel detection window is defined by specifications, e.g., slots n4-1000, n4-999, . . . , n4-1 may be defined as the channel detection window. For a slot detected by the first UE, the first UE decodes the PSCCH in the slot, measures reference signal average receiving power of multiple PSSCHs on the resource pattern, priority of data transmitted by the PSSCHs and a resource pattern reservation interval according to the decoded PSCCH. The first UE further measures an average receiving energy of the resource pattern in the channel detection window.

The first UE estimates, according to the measurement result in the channel detection window, PSSCH reference signal receiving power of each candidate resource pattern and average receiving energy of each candidate resource pattern in the resource selection window. The estimation may be performed similarly as a conventional method, but the resource pattern is taken as a detection unit. The procedure is described in the following.

The first UE estimates the PSSCH reference signal receiving power of the candidate resource pattern in the resource selection window as follows: if the first UE successfully detects the PSCCH scheduling resource pattern Q in the channel detection window, and measures the PSSCH reference signal receiving power on the resource pattern Q, suppose that the PSCCH indicates a resource reservation interval p, the first UE regards that the second UE transmitting the above PSSCH will also transmit PSSCH on the same resource pattern after p slots, and the PSSCH reference signal receiving power on that resource pattern is the same.

The first UE may estimate the average receiving energy of each resource pattern in the resource selection window as follows: for any resource pattern Q in the resource selection window, the first UE regards an average of receiving energies measured on resource patterns with an interval of integer times of Pm starting from the resource pattern Q as the average receiving energy of the resource pattern Q. Pm denotes a measurement interval, it may be defined by specifications, or configured by the eNB or preconfigured. For example, Pm may be equal to 100, or equal to a reservation interval for the data to be transmitted by the first UE, or equal to a minimum resource reservation interval allowed by the current resource pool.

Then, in the set Sp, the first UE selects according to the above estimation result a resource pattern with less resource being occupied by the second UE to determine the SLG. The detailed selection manner may be configured according to a practical requirement. The principle for the selection is to select those with fewer resources occupied by other UEs as much as possible. As such, the data of the first UE may have a little probability to collide with other UEs and lost, and the data transmission reliability may be increased. In particular, the resource pattern on which resources occupied by the second UE is lower than a defined requirement may be selected. Herein, the defined requirement may be either an explicit requirement, or a requirement implicitly generated based on the selection of the resource pattern. In addition, the second UE may be not a single one, but include multiple UEs detected by the first UE. Hereinafter, one selection manner is provided.

In particular, the first UE may select resource pattern from set SP to determine the SLG according to one of the following steps:

The first UE excludes resource patterns with PSSCH reference signal average receiving power higher than a specified threshold from the resource patterns of the set SP according to the estimated PSSCH reference signal average receiving power and the priority of the data transmitted by the PSSCH on the resource patterns in the set SP, the specified threshold is relevant to the priority of the data transmitted by the PSSCH and the priority of the data to be transmitted by the first UE.

2. The first UE sorts the remaining resource patterns of the set SP according to their average receiving energies, selects one resource pattern from Y % resource patterns with lowest receiving energy, and takes the selected resource pattern as the PSCCH transmission resources of the SLG; wherein when selecting the resource pattern from the Y % resource patterns with lowest receiving energy, the selection may be performed according to a requirement, e.g., randomly select with equal probability.

Y is a specified value, which may be configured by the base station, preconfigured or defined by specifications.

The first UE may occupy the resource pattern of the SLG semi-persistently with a specified time interval, the specified time interval may be determined by a higher layer of the UE (e.g., MAC layer of the UE).

In this embodiment, the PSCCH transmitted by the UE may indicate the index of the transmission resource pattern of the PSSCH scheduled by the PSCCH. The index may be indicated explicitly or implicitly. For example, there may be a fixed mapping relationship between the positions of the PSCCH frequency resources and the positions of the RBs occupied by the PSSCH transmission resource pattern in the current slot. Thus, the index of the resource pattern may be implicitly indicated by the frequency resource index of the PSCCH.

The above describes the resource allocation method in the sidelink communications provided by the embodiments of the present disclosure. Some embodiments of the present disclosure also provide a resource allocation apparatus, applicable for implementing the above resource allocation method.

Figure 8:
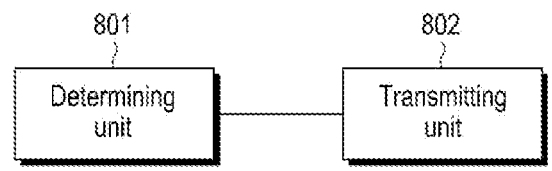
FIG. 8 is a block diagram illustrating a structure of an apparatus for resource allocation according to various embodiments of the present disclosure.

FIG. 8 is a block diagram illustrating a structure of the apparatus according to some embodiments of the present disclosure. As shown in FIG. 8, the apparatus includes: a determining unit 801 and a transmitting unit 802.

The determining unit is configured to determine a sidelink grant SLG. The SLG includes positions of M PSSCH transmission resources, the M PSSCH transmission resources are used for M times of transmission of a Transmission Block (TB), M is an integer. The transmitting unit is configured to transmit a PSCCH and the PSSCH according to the determined SLG.

According to the resource allocation method and apparatus provided by the embodiments of the present disclosure, it is possible to ensure the data transmission delay as well as decrease the half-duplex impact between different UEs, so as to improve data successful receiving rate.

In the following, unless specifically explained, the first UE refers to a UE which performs the channel detection and resource selection or reselection, and the second UE refers to the UE detected by the first UE.

In order to increase the system capacity and data rate of the V2X communication, the UE needs to implement the V2X communication via multiple sidelink carriers. In order to solve problems such as half-duplex restriction and In Band Emission (IBE) interferences exist in the multi-carrier sidelink communication, various embodiments of the present disclosure provide a resource selection or reselection method in V2X communication. This method is able to increase the probability that the UE selects the frequency resources of the same subframe during resource selection or reselection on multiple carriers, so as to solve the half-duplex restriction and IBE interference in the multi-carrier sidelink communication environment, and improve the performance of the V2X system.

Figure 9:
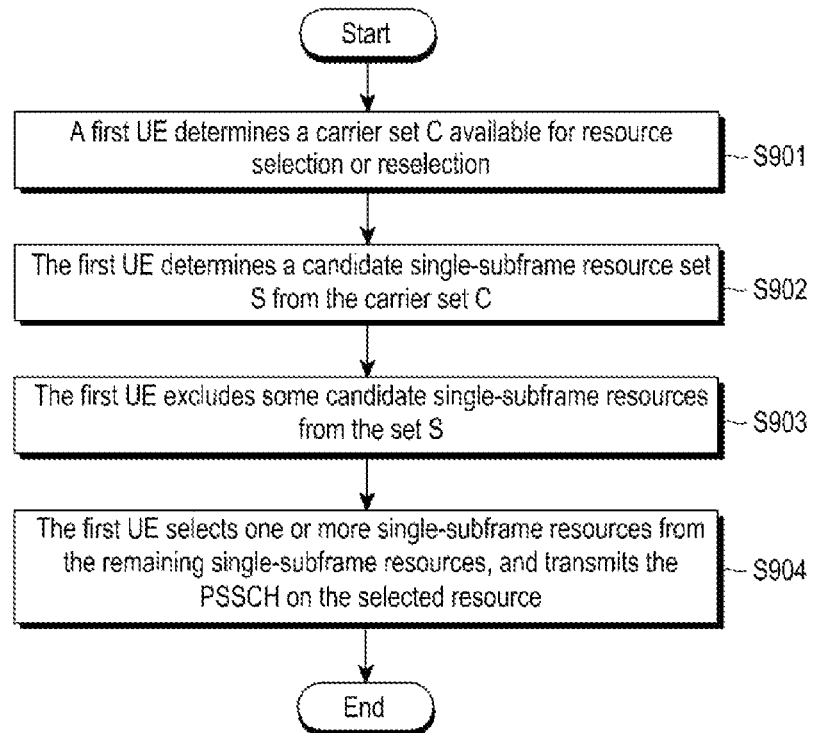
FIG. 9 is a flowchart illustrating a resource selection or reselection method according to some embodiments of the present disclosure.

FIG. 9 is a flowchart illustrating a resource selection or reselection method according to various embodiments of the present disclosure. As shown in FIG. 9, the method includes the following.

At block S901, a first UE determines a carrier set C available for resource selection or reselection.

The carrier set C may include one or more carriers. The UE may determine the available candidate carriers from a configured or pre-configured set CS of all carriers according to a current service type. Further, the UE may determine one or more carriers available for channel selection or reselection from the candidate carriers according to information such as Channel Busy Ratio (CBR) of each candidate carrier. In various embodiments, the first UE may select one or more carriers with the lowest CBR from the carrier set CS, or select one or more carriers with CBR lower than a certain threshold from the set CS, wherein the threshold may be defined by specifications, or configured by an eNB or pre-configured. Suppose that the number of carriers in the carrier set C is N1.

The UE may determine the above set CS of all carriers according to signalling SystemInformationBlockType21 or RRCConnectionReconfiguration defined in 3GPP TS 36.331 V14.3.0. In this case, multiple or all carriers in the set CS may correspond to the same parameter typeTxSync, or, each carrier corresponds to its own parameter typeTxSync, but the values of all typeTxSync are same. For example, the carriers in the set Cs are divided into multiple carrier groups, each carrier group includes one or more carriers, the one or more carriers in one carrier group correspond to the same typeTxSync. The value of the typeTxSync may be eNB or GNSS, denoting that the carriers preferably take the eNB or GNSS as a reference synchronization source. In addition, the UE may determine the above set Cs of all carriers via pre-configuration. In this case, the multiple or all carrier in the Cs may correspond to the same parameter syncPriority, or, each carrier corresponds to its respective parameter syncPriority, but the values of them are the same. For example, the carriers in the set Cs are divided into groups, each group include one or more carriers, the one or more carriers in each group correspond to the same syncPriority. The value of syncPriority may be eNB or GNSS, denoting that the multiple carriers preferably take the eNB or GNSS as the reference synchronization source.

According to various embodiments of the present disclosure, if the carrier set C includes one or multiple carriers, the configuration of Sidelink Synchronization Signal (SLSS) subframes on some or all carriers are the same. For example, SLSS transmission periodicity on each carrier in the same frequency band in the carrier set C, number of SLSS subframes in each SLSS transmission periodicity, and the offset of each SLSS transmission subframe in each SLSS transmission periodicity are the same, so as to ensure that the number and positions of subframes available for transmitting the PSCCH and PSSCH are the same on multiple carriers, and avoid that one subframe on one carrier overlaps with subframes on another one or more carriers. Or, if the carrier set C includes one or more carriers, the pre-configuration of Sidelink Synchronization Signal (SLSS) subframes on some or all carriers in the carrier set C should be the same. If subframe x is an SLSS subframe according to pre-configuration information, subframe x cannot be put into resource pool, i.e., bit map for resource pool configuration cannot map to subframe x.

According to another embodiment of the present disclosure, if the carrier set C includes one or multiple carriers, Sidelink synchronization signal (SLSS) subframes may be configured differently on some or all carriers. In this situation, if subframe x is an SLSS subframe on any one of the carriers, subframe x on all carriers cannot be put into resource pool, i.e., bit map for resource pool configuration cannot map to subframe x. For example, for multiple interfering carriers in carrier set C, if the SLSS transmission periodicity, the number of SLSS subframes in each SLSS transmission periodicity and the offset of each SLSS transmission subframe in each SLSS transmission periodicity are not the completely same, all SLSS transmission subframes on the multiple interfering carriers cannot used for the resource pool configuration. The first UE may regard the carriers in the same frequency band as interfering carriers, or regards multiple carriers adopting the same transmission or receiving radio link as interfering carriers, or the first UE may determine the multiple interfering carriers according to configuration signaling or pre-configuration of the eNB. Or, if the carrier set C includes one or more carriers, the pre-configuration for the SLSS subframe on some or all carriers may be different. In this case, according to the pre-configuration information of each carrier, if subframe x is an SLSS subframe on any carrier, subframe x on all carriers cannot be put into the resource pool, i.e., bit map for resource pool configuration cannot map to subframe x.

According to another embodiment of the present disclosure, if the carrier set C includes one or multiple carriers, for some or all carriers of the carrier set C, the SLSS transmission subframes on these carriers and the resource are configured independently.

In some embodiments, if the carrier set C includes multiple carriers, for each carrier:

In block S902, the first UE determine a candidate single-subframe resource set S from the carrier set C.

In various embodiments, if sub-channels included in a single-subframe resource are located on the same carrier, it is referred to as a single-carrier single-subframe resource. In this situation, it is defined that a single-subframe resource $R_{x,y}$ on any carrier c in the carrier set C includes $L_{subCH}^{c}$ continuous sub-channels starting from sub-channel x in subframe $t_y^{SL}$, wherein y denotes a relative index of subframe $t_y^{SL}$ in the resource pool;

$L_{subCH}^{c}$ is determined by a higher layer of the UE (e.g. MAC layer), and denotes the number of sub-channels used for one PSSCH transmission on carrier c, c=0, 1 . . . , N1−1.

If the UE performs resource selection or reselection in subframe n, the UE regards $L_{subCH}^{c}$ continuous sub-channels in subframes belonging to the resource pool within [n+T1, n+T2] on carrier c as candidate single-subframe resources, wherein the determination of T1 and T2 are subject to the implementation of the UE. Assume that the total number of single-subframe resources on carrier c is $M_{total}^{c}$, the $M_{total}^{c}$ candidate single-subframe resources constitute a set SC. In various embodiments, a union of single-carrier single-subframe resource sets of the carriers in the carrier set C forms the candidate single-subframe resource set S.

Figure 10:
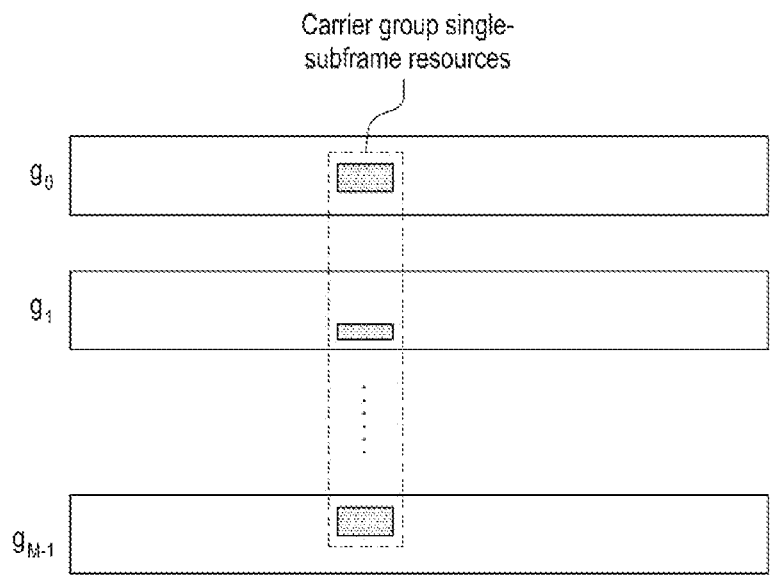
FIG. 10 is a schematic diagram illustrating carrier group single-subframe resource according to some embodiments of the present disclosure.

In various embodiments, the carriers in the carrier set C are divided into one or more carrier groups, and one carrier group includes one or more carriers. For example, carriers belonging to the same frequency band in the carrier set C are in the same carrier group. In this situation, subchannels included in one single-subframe resource may be located on multiple carriers in one carrier group, which is referred to as a carrier-group single-subframe resource. The carrier group may be configured by the eNB or configured in advance, or may be determined by a higher layer of the UE (e.g. UE MAC layer). Suppose that the carrier set C includes R carrier groups, the carrier group G includes M1 carriers, wherein G=0, 1, . . . , R−1, M1≤N, and M1 may be equal to 1. The carriers in the carrier group are respectively g0, g1, . . .

gM1−1, then one carrier-group single-subframe resource $R_{x_g,y}^G$ in carrier group G is defined as $L_{subCH}^{g0}$ continuous subchannels starting from subchannel $x_{g_0}$ on carrier g0 of subframe $t_y^{SL}$, $L_{subCH}^{g1}$ continuous subchannels starting from subchannel $x_{g_1}$ on carrier g1 of subframe $t_y^{SL}$, . . . , and $L_{subCH}^{gM1}-1$ continuous subchannels starting from subchannel $x_{g_M}-1$ on carrier gM1−1 of subframe $t_y^{SL}$, as shown in FIG. 10; wherein y denotes a relative index of the subframe $t_y^{SL}$ in the resource pool;

$L_{subCH}^{g1}$ is determined by a UE physical layer and meets $$\sum_{i=0}^{i=M1-1} L_{subCH}^{gi} = L,$$

L is determined by the higher layer of the UE (e.g. MAC layer), i=0, 1, . . . , M1−1; or, $L_{subCH}^{g1}$ is determined by the higher layer of the UE, e.g., determined by the UE MAC layer. It should be noted that, one or more of $L_{subCH}^{g0}$, $L_{subCH}^{g1}$, . . . , and $L_{subCH}^{gM1}-1$ may be 0.

If the UE performs resource selection or reselection in subframe n, the UE regards $L_{subCH}^{g0}$, $L_{subCH}^{g1}$, . . . , and $L_{subCH}^{gM1}-1$ continuous subchannels respectively on carriers g0, g1, . . . gM1−1 in any subframe belonging to the resource pool and within [n+T1, n+T2] on the carrier group G as the candidate single-subframe resources, wherein the values of T1 and T2 are subject to the implementation of the UE. Assume that the total number of single-subframe resources in carrier group G is $M_{total}^G$, the $M_{total}^G$ candidate single-subframe resources constitute a set SG. In some embodiments, a union of the single-subframe resources of all carrier groups in the carrier set C forms the candidate single-subframe resource set S.

At block S903, the first UE excludes some candidate single-subframe resources from the set S.

It should be noted that, this block is optional. If this block is not executed, the exclusion operation is not performed to the single-subframe resources in the set S. Accordingly, in following processing, operations performed with respect to remaining single-subframe resources in sets S, SC and SG, are adjusted to be performed to the sets S, SC and SG.

Suppose that the UE performs resource selection in subframe n.

Firstly, the UE may determine some candidate single-subframe resources to be excluded from the set S according to a determined receiving operation in a future subframe. That is, if the UE has determined to perform a receiving operation on one or more carriers in one or more subframes after subframe n, the UE may exclude some candidate single-subframe resources which overlap or conflict with the above one or more subframes from the set S. In particular, without loss generality, suppose that the UE has determined to perform a receiving operation in subframe m after subframe n on carrier c. For any subframe y containing single-subframe resources in the set S, if there is a variable j∈{0, 1, . . . , $C_{resel}-1$} which makes the single-subframe resource y+j×$P_{rsvp\_TX}$ overlap with subframe m, wherein Cresel denotes the number of times that resource is to be reserved after resource reselection, $P_{rsvp\_TX}$ denotes an assumed resource reservation period used for determining available candidate single-subframe resources indicated by higher layer of the UE, the first UE excludes all single-subframe resources in subframe y on all carriers interfering with carrier c from the set S. The first UE may determine that all carriers in the same frequency band with carrier c are carriers interfering with carrier c, or determines carriers using the same transmission or receiving radio link with carrier c as carriers interfering with carrier c, or the first UE may determine the carriers interfering with carrier c according to configuration signaling of the eNB or a pre-configuration. The determined receiving operation to be performed by the UE includes but is not limited to: receiving SLSS in subframe m on one or more carriers according to an SLSS receiving rule; receiving downlink control channel or data channel in subframe m on one or more carriers according to a downlink receiving control behavior or a data channel receiving behavior. The downlink control or data channel includes at least one of:

a PDCCH indicating a Random Access Response (RAR) and a PDSCH carrying the RAR;

a Physical Broadcast Channel (PBCH);

a PDCCH indicating transmission of broadcast signaling, and a PDSCH bearing broadcast signaling; and a PDSCH transmitted in a semi-persistent scheduling manner.

In addition, the first UE may exclude some candidate single-subframe resources from the candidate single-subframe set S according to the PSCCH detected in a channel detection window and an S-RSSI measured in the channel detection window.

If the UE performs resource selection in subframe n, the UE may detect in subframes in the channel detection window before subframe n on each carrier of the carrier set C, the channel detection window may be defined by specifications, e.g., subframes n-1000, n-999, . . . , a PDCCH indicating a Random Access Response (RAR) and a PDSCH carrying the RAR;

a Physical Broadcast Channel (PBCH);

a PDCCH indicating transmission of broadcast signaling, and a PDSCH bearing broadcast signaling; and a PDSCH transmitted in a semi-persistent scheduling manner.

In addition, the first UE may exclude some candidate single-subframe resources from the candidate single-subframe set S according to the PSCCH detected in a channel detection window and an S-RSSI measured in the channel detection window.

If the UE performs resource selection in subframe n, the UE may detect in subframes in the channel detection window before subframe n on each carrier of the carrier set C, the channel detection window may be defined by specifications, e.g., subframes n-1000, n-999, . . . , n-1 may be defined as a channel detection window. As to a subframe detected by the first UE, the first UE measures the PSSCH-RSRP according to a decoded PSCCH and measures the S-RSSI of the subframe.

The first UE excludes the candidate single-subframe resources from the set S according to the following two steps.

Candidate single-subframe resource exclusion step 1:

If the first UE detects a PSCCH in subframe $t_m^{SL}$ in the channel detection window on carrier c, c=0, 1 . . . , N1−1, and the value of a priority field in the PSCCH is $prio_{RX}$, according to a resource reservation indication, the PSCCH reserves the same frequency resources in subframe $$t_{m+P_{rsvp\_RX}}^{SL},$$

and the PSSCH-RSRP measured on the PSSCH scheduled by the PSCCH is higher than a threshold $Th_{prio_{TX},prio_{RX}}^{c}$, wherein $prio_{RX}$ denotes the value of the priority field in a subsequently transmitted PSCCH indicated by the higher layer of the UE, $Th_{prio_{TX},prio_{RX}}^{c}$ is configured by the eNB or is pre-configured, and denotes a threshold for the PSSCH-RSRP when the value of the priority field of the subsequently transmitted PSCCH indicated by the higher layer of the first UE is $prio_{TX}$, whereas the measured priority of the PSCCH is $prio_{RX}$. Then:

If the set S is a single-carrier single-subframe resource set, for any single-carrier single-subframe resource $R_{x,y}^{c}$ in a subset SC of the set S, if there is a variable $j \in \{0, 1, \ldots, C_{resel}-1\}$ which makes the single-subframe resource $$R_{x,y+j \times P_{rsvp\_TX}}^{c}$$

overlap with reserved resources indicated in the PSCCH, wherein Cresel denotes the number of times that resource is to be reserved after resource reselection of the UE, $P_{rsvp\_TX}$ denotes the assumed resource reservation period for determining the available candidate single-subframe resource indicated by higher layer of the UE, the first UE excludes the single-subframe resource $R_{x,y}^{c}$ when performing resource selection or reselection, i.e., the first UE deletes the single-subframe resource $R_{x,y}^{c}$ from the set SC.

If the set S is a carrier-group single-subframe resource set, and carrier c belongs to carrier group G, for any carrier-group single-subframe resource $R_{x_g,y}^{G}$ in subset SG in subset $j \in \{0, 1, \ldots, C_{resel}-1\}$ which makes the carrier-group single-subframe resource $$R_{x_g,y+j \times P_{rsvp\_TX}}^{G}$$

overlap with the reserved resources indicated in the PSCCH, wherein Cresel denotes the number of times that resource is to be reserved after resource reselection of the UE, $P_{rsvp\_TX}$ denotes the assumed resource reservation period for determining the available candidate single-subframe resource indicated by higher layer of the UE, the first UE excludes the single-subframe resource $R_{x_g,y}^{G}$ when performing resource selection or reselection, i.e., the first UE deletes the single-subframe resource $R_{x_g,y}^{G}$ from the set SG.

Candidate single-subframe resource exclusion step 2:

If the set S is a single-carrier single-subframe resource set, for any remaining single-subframe resource $R_{x,y}^{c}$ in subset Sc of the set S, $c=0, 1, \ldots, N1-1$, the first UE calculates an average value of S-RSSI measured on subchannels x+k' in subframe $t_{y-P*j}^{SL}$ in the channel detection window, wherein j is an integer larger than 0, and $K'=0, \ldots, L_{subCH}^{c}-1$, P is a predetermined value, it may be defined by specifications, configured by eNB or pre-configured, and denotes S-RSSI average period, e.g., P=100 or an assumed resource reservation period for determining available candidate single-subframe resources indicated by higher layer of the UE; the average value of S-RSSI is noted by $E_{x,y}^{c}$. The first UE excludes 1-X2% resources with highest $E_{x,y}^{c}$ from the remaining single-subframe resources in set SC, wherein X2 is a predefined value, it may be defined by specifications, or determined by the first UE according to configuration of the eNB, a pre-configuration or a current service type.

If the set S is a carrier-group single-subframe resource set, for any remaining single-subframe resource $R_{x_g,y}^{G}$ in subset SG of set S, $G=0, 1, \ldots, R-1$, the first UE calculates an average value of S-RSSI measured on subchannels x+k' on carrier gi in subframes $t_{y-P*j}^{SL}$ in the channel detection window, wherein j is an integer larger than 0, i=0, 1 ..., M1-1 and $k'=0, \ldots, L_{subCH}^{c}-1$, P is a predetermined value, it may be defined by specifications, configured by eNB or pre-configured, and denotes S-RSSI average period, e.g., P=100 or an assumed resource reservation period for determining available candidate single-subframe resources indicated by higher layer of the UE; the average value of S-RSSI is noted by $E_{x,y}^{G}$ from the remaining single-subframe resources in set SG, wherein X2 is a predefined value, it may be defined by specifications, or determined by the first UE according to configuration of the eNB, a pre-configuration or a current service type.

At block S904, the first UE selects one or more single-subframe resources from the remaining single-subframe resources, and transmits the PSSCH on the selected resource.

If the set S is a single-carrier single-subframe resource set, i.e. carrier group is not configured, according to some embodiments of the present disclosure, the first UE may select only one single-carrier single-subframe resource from the remaining single-carrier single-subframe resources of the set S for data transmission. At this time, the first UE may randomly select one single-carrier single-subframe resource from the remaining single-carrier single-subframe resources of the set S with equal probability, or, the first UE may randomly select a carrier c from all carriers in the carrier set C with equal probability, and then randomly select a single-carrier single-subframe resource with equal probability from the remaining single-carrier single-subframe resources of the set SC.

If the set S is a single-carrier single-subframe resource set, i.e., carrier group is not configured, according to some embodiments of the present disclosure, the first UE may select multiple single-carrier single-subframe resources from the remaining single-carrier single-subframe resources of the set S for data transmission. At this time, the first UE may randomly select multiple or all carriers with equal probability from the carriers in the carrier set C, and randomly select one single-carrier single-subframe resource with equal probability from the remaining single-carrier single-subframe resources of each selected carrier.

If the set S is a single-carrier single-subframe resource set, i.e. carrier group is not configured, according to some embodiments of the present disclosure, the first UE may select multiple single-carrier single-subframe resources from the remaining single-carrier single-subframe resources of the set S for data transmission. At this time, the first UE sorts the carriers in the carrier set C according to their priorities or CBR, suppose that the order of the carriers is: carrier 0>carrier 1> . . . >carrier N1-1. Then, the first UE randomly select one single-carrier single-subframe resource with equal probability from the remaining single-carrier single-subframe resources of carrier 0, and assume that the subframe where the selected single-carrier single-subframe resource is located is t0; then, if subframe t0 has remaining single-carrier single-subframe resources on carrier 1, the first UE randomly select one single-carrier single-subframe resource from them with equal probability, if subframe t0 does not have remaining single-carrier single-subframe resources on carrier 1, the first UE randomly select one single-carrier single-subframe resource from the remaining single-carrier single-subframe resources of carrier 1, assume the subframe that the single-carrier single-subframe resource selected on carrier 1 is t1; thereafter, the first UE selects single-carrier single-subframe resources on other carriers following the same method.

If the set S is a single-carrier single-subframe resource set, i.e. carrier group is not configured, according to some embodiments of the present disclosure, the first UE may select multiple single-carrier single-subframe resources from the remaining single-carrier single-subframe resources of the set S. At this time, the first UE selects at most one single-carrier single-subframe resource on each carrier, and indexes of subframes where the single-carrier single-subframe resource selected by the first UE are located have a minimum variance. If there are multiple selection manners with the minimum variance, the first UE may randomly select one of them with equal probability as the final selection.

If the set S is a single-carrier single-subframe resource set, i.e. carrier group is not configured, according to some embodiments of the present disclosure, the first UE randomly selects X1 single-carrier single-subframe resources from the remaining single-carrier single-subframe resources of each subset SC of the set S. Then, the first UE selects me single-carrier single-subframe resources from the X1 single-carrier single-subframe resources selected from each set Sc for transmitting the PSSCH, wherein c=0, 1, . . . , N1−1, and mc=1 or 1.

If the set S is a carrier-group single-subframe resource set, i.e., carrier group is configured, in some embodiments of the present disclosure, the first UE may select only one carrier-group single-subframe resource from the remaining carrier-group single-subframe resources of the set S for data transmission. At this time, the first UE may randomly select one carrier-group single-subframe resource from the remaining carrier-group single-subframe resources of the set S; or, the first UE may randomly select a carrier group G with equal probability from all carrier groups of the carrier set C, and then randomly selects a carrier-group single-subframe resource with equal probability from the remaining carrier-group single-subframe resources of the set SG.

If the set S is a carrier-group single-subframe resource set, i.e., carrier group is configured, in some embodiments of the present disclosure, the first UE may select multiple carrier-group single-subframe resources from the remaining carrier-group single-subframe resources of the set S for data transmission. At this time, the first UE may select at most one carrier-group single-subframe resource from each carrier group. The first UE may randomly select multiple carrier groups or all carrier groups with equal probability from the carrier groups of the carrier set C, and then randomly select one carrier-group single-subframe resource with equal probability from the remaining carrier-group single-subframe resources of each selected carrier group.

It should be noted that, after the first UE performs the above resource selection, the first UE will occupy the selected single-subframe resources for Y1 periodicities according to a particular resource reservation period, wherein Y1 is a random value within a range determined by higher layer of the UE, e.g., randomly determined by the MAC layer of the UE within 5-15. When occupying the selected single-subframe resources in the semi-persistent manner, if the size of the data packet transmitted by the first UE changes, the current single-subframe resource may be unable to bear the new data packet even if the highest allowable modulation level and code rate are adopted. In this situation, in some embodiments, the first UE may give up the current selected single-subframe resource, and performs the blocks S901 to S904 to reselect a single-subframe resource. Or, the first UE may keep the currently selected single-subframe resource, and performs the above blocks S901 to S904 to select an additional single-subframe resource on a carrier other than the carrier where the current single-subframe resource is located.

The technical solution of the present disclosure is described in further detail hereinafter with reference to detailed application scenarios and interactions between devices to make the solution of the present disclosure clearer.

Embodiment 5

In embodiment 5, the multiple carriers on which the first UE performs channel detection and resource selection belong to one carrier group, i.e., the single-subframe resource is a carrier-group single-subframe resource. This embodiment includes the following operations.

At block S1001, the first UE determines a carrier set C available for resource selection or reselection.

In this embodiment, the carrier set C may include multiple carriers, and all carriers in the carrier set C belong to the same carrier group. Suppose that the number of carriers in the carrier set C is N. The number and positions of the subframes used for SLSS transmission on respective carrier are completely the same. Or, if the configuration of the subframes used for SLSS transmission is different on the N1 carriers, all subframes used for SLSS transmission on the N1 carriers are not included in the resource pool.

At block S1002, the first UE determines a candidate single-subframe resource set S in the carrier set C.

In this embodiment, suppose that the UE performs resource selection or reselection in subframe n, the carriers in the carrier set C form a carrier group G, the carrier group G includes M carriers, then the UE determines $L_{subCH}^{g_0}$, $L_{subCH}^{g_1}, \ldots$ and $L_{subCH}^{g_{M-1}}$−1 may be zero. The set SG is the set S.

At block S1003, the first UE excludes some candidate single-subframe resources from the set S according to a channel detection result.

Suppose that the UE performs resource selection in subframe n. The UE may detect in subframes of the channel detection window before subframe n on each carrier of the carrier set C, wherein the channel detection window is defined by specifications. For example, it may be defined that subframes n-1000, n-999, . . . , n-1 form the window detection window. As to the subframe detected by the first UE, the first UE measures PSSCH-RSRP of the subframe according to the decoded PSCCH, and measures S-RSSI of the subframe.

In this embodiment, the candidate single-subframe resource exclusion step 1 may be performed as follows.

If the first UE detects PSCCH in subframe $t_m^{SL}$ in the channel detection window on carrier c, c=0, 1, . . . , N1−1, and the value of the priority field in the PSCCH is $prio_{RX}$ according to a resource reservation indication, the PSCCH reserves the same frequency resources in subframe $$t_{m+P_{rsvp\_RX}}^{SL}$$

and value of the PSSCH-RSRP measured on the PSSCH scheduled by the PSCCH is greater than a specific threshold $Th_{prio_{TX},prio_{RX}}^{c}$; wherein $prio_{TX}$ denotes the value of the priority field in a subsequently transmitted PSCCH indicated by higher layer of the first UE, $Th_{prio_{TX},prio_{RX}}^{c}$ is configured by the eNB or is preconfigured, denoting a threshold value for the PSSCH-RSRP in the case that the value of the priority field in the subsequently transmitted PSCCH on carrier c indicated by the higher layer of the first UE is $\text{prio}_{TX}$, whereas the priority field of the detected PSCCH is $\text{prio}_{RX}$. Then:

For any carrier-group single-subframe resource $R_{x_g,y}^G$ in the set S (i.e. SG), if there is a variable $j \in \{0, 1, \ldots, C_{resel}-1\}$ which makes the carrier-group single-subframe resource $$R_{x_g,y+j \times P_{rsvp\_TX}}^G$$

overlap with the reserved resources indicated in the PSCCH, wherein Cresel denotes the number of times that resource is to be reserved after resource reselection of the UE, $P_{rsvp\_TX}$ denotes assumed resource reservation period for determining available candidate single-subframe resources indicated by higher layer of the UE, the first UE deletes the single-subframe resource $R_{x_g,y}^G$ from the set SG.

In this embodiment, the candidate single-subframe resource exclusion step 2 may be performed as follows.

For a remaining single-subframe resource $R_{x_g,y}^G$ in the set S (i.e., SG), G=0, 1, ..., R-1, the first UE calculates an average value of the S-RSSI measured on subchannels x+k' on carrier gi in subframe $t_{y-P \circ j}^{SL}$ in the channel detection window, wherein j is an integer greater than 0, i=0, 1, ..., M1-1, k'=0, ..., $L_{subCH}^c$-1, P is a given value, which may be defined by specifications, configured by the eNB or preconfigured and denotes the S-RSSI average period. For example P=100 or equals to the assumed resource reservation period for determining the available candidate single-subframe resources indicated by higher layer of the UE. The value of the S-RSSI is denoted by $E_{x,y}^G$. The first UE excludes 1–X2% single-subframe resources with highest $E_{x,y}^G$ from the remaining single-subframe resources in the set SG. The value of X2 may be defined by specifications, or configured by the first UE according to information such as eNB configuration, a pre-configuration, a current service type, etc.

At block S1004, the first UE selects one or more single-subframe resources from the remaining single-subframe resources in the set S and transmits the PSSCH on the selected resources.

In this embodiment, the first may randomly select one carrier-group single-subframe resource with equal probability from the remaining carrier-group single-subframe resources of the set S, and transmit the PSSCH using the selected carrier-group single-subframe resources.

If the UE needs to transmit signals on multiple carriers at a given time, the signals include PSSCH, PSCCH and uplink signals, according to various embodiments of the present disclosure, the UE may adjust the transmit power according to the following sequence.

Step 1, if the value of the priority field of the PSCCH transmitted by the UE on one or more carriers is greater than or equal to thresSL-TxPrioritization, this means that the PSSCH transmitted by the UE on the one or more carriers carries V2X data with a priority lower than thresSL-TxPrioritization, wherein thresSL-TxPrioritization denotes a priority threshold which may be configured by the eNB or preconfigured, the UE shall adjust the sidelink transmit power on one or more carriers whose "priority" field has the value greater than or equal to thresSL-TxPrioritization, so as to make the total transmit power of the UE lower than an allowable maximum transmit power PCMAX of the UE.

Step 2, if the values of the "priority" fields of the PSCCH on all current sidelink carriers of the UE are lower than thresSL-TxPrioritization, or the total transmit power is still higher than PCMAX after the UE adjusts the transmit power on all carriers meeting the condition in step 1 to 0, and the UE transmits uplink signals on one or more carriers, the UE shall adjust the transmit power of the uplink signals on one or more carriers, so as to make the total transmit power of the UE lower than the allowed maximum transmit power PCMAX of the UE.

Step 3, if the values of the "priority" fields of the PSCCH on all current sidelink carriers of the UE are lower than thresSL-TxPrioritization, and the UE does not transmit uplink signal on any carrier, the UE shall adjust the sidelink signal transmit power on the carriers, so as to make the total transmit power of the UE lower than the allowed maximum transmit power PCMAX of the UE.

If the UE needs to transmit signals on multiple carriers at a given time, according to another embodiment of the present disclosure, the UE adjust the transmit power following step 1 of block S1004: the UE determines the priority of the transmit signal on each carrier, adjust the transmit power of one or more carriers used for transmitting data with lowest priority, so as to make the total transmit power of the UE lower than the allowed maximum transmit power PCMAX of the UE. If the total transmit power of the UE is still higher than PCMAX after the power of the above carrier is adjusted to 0, the UE repeats step 1 of block S1004 for the remaining carriers until the total transmit power of the UE becomes lower than the allowed maximum transmit power PCMAX of the UE. The priority of the sidelink signal is determined by the value of the "priority" field in the PSCCH of the sidelink signal. The higher the value of the priority field, the lower the priority level. If there are uplink signals, the priority of the uplink signals is higher than the sidelink signal with priority value thresSL-TxPrioritization, but lower than the sidelink signal with priority value thresSL-TxPrioritization-1, thresSL-TxPrioritization denotes a priority threshold which may be configured by the eNB or preconfigured, thresSL-TxPrioritization-1 denotes thresSL-TxPrioritization minus 1.

Embodiment 6

In embodiment 6, the multiple carriers on which the first UE performs channel detection and resource selection belong to multiple carrier groups. For example, one or more carriers belonging to the same frequency band in carrier set C belong to the same carrier group. At this time, the single-subframe resource is a carrier-group single-subframe resource. This embodiment includes the following operations.

At block S1101, the first UE determines a carrier set C available for resource selection or reselection.

In this embodiment, the carrier set C includes multiple carriers, and the carriers in the carrier set C belong to multiple carrier groups. Assume that the number of carriers in the carrier group C is N1, the N1 carriers respectively belongs to R carrier groups, and the number and positions of subframes used for SLSS transmission are completely the same on the carriers within each carrier group. Or, the SLSS transmission subframes may be configured differently on the carriers within each carrier group, but all of the SLSS transmission subframes on the carriers within the carrier group are not used for configuring the resource pool.

At block S1102, the first UE determines a candidate single-subframe resource set S in the carrier set C.

In this embodiment, suppose that the UE performs resource selection or reselection in subframe n, for any carrier group G in the carrier set C, the UE determines $L_{subCH}^{g0}, L_{subCH}^{g1}, \ldots, L_{subCH}^{gM1-1}$ continuous subchannels respectively on carriers g0, g1, ..., gM1-1 in any subframe belonging to the resource pool and within [n+T1, n+T2] on the carrier group G as the candidate single-subframe resources, wherein T1 and T2 are subjected to the implementation of the UE. The total number of single-subframe resources on carrier group G is denoted by $M_{total}^G$, the $M_{total}^G$ candidate single-subframe resources constitute a set SG. It should be noted that, $L_{subCH}^{g0}, L_{subCH}^{g1}, \ldots, L_{subCH}^{gM1-1}$ are determined by higher layer of the UE, e.g., MAC layer of the UE, and one or more of them may be zero. The union of the sets SG of all carrier groups forms the set S.

At block S1103, the first UE excludes some candidate single-subframe resources from the set S according to a channel detection result.

Suppose that the UE performs resource selection in subframe n. The UE may detect in subframes of the channel detection window before subframe n on each carrier of the carrier set C, wherein the channel detection window is defined by specifications. For example, it may be defined that subframes n−1000, n−999, ..., n−1 form the window detection window. As to a subframe detected by the first UE, the first UE measures PSSCH-RSRP of the subframe according to a decoded PSCCH, and measures S-RSSI of the subframe.

In this embodiment, the candidate single-subframe resource exclusion step 1 may be performed as follows.

If the first UE detects a PSCCH in subframe $t_m^{SL}$ in the channel detection window on carrier c, c=0, 1, ..., N1−1, and the value of the priority field in the PSCCH is $prio_{RX}$, according to a resource reservation indication, the PSCCH reserves the same frequency resource on subframe $$t_{m+P_{rsvp\_RX}}^{SL},$$

and value of the PSSCH-RSRP measured on the PSSCH scheduled by the PSCCH is greater than a specific threshold $Th_{prio_{TX},prio_{RX}}^c$; wherein $prio_{TX}$ denotes the value of the priority field in a subsequently transmitted PSCCH indicated by higher layer of the first UE, $Th_{prio_{TX},prio_{RX}}^c$ is configured by the eNB or is preconfigured, denoting a threshold value for the PSSCH-RSRP in the case that the value of the priority field in the subsequently transmitted PSCCH on carrier c indicated by the higher layer of the first UE is $prio_{TX}$, whereas the priority field of the detected PSCCH is $prio_{RX}$. Then:

If carrier c belongs to carrier group G, for any carrier-group single-subframe resource $R_{x_g,y}^G$ in the set SG of the carrier group G, if there is a variable $j \in \{0, 1, \ldots, C_{resel}-1\}$ which makes the carrier-group single-subframe resource $$R_{x_g,y+j\times P_{rsvp\_TX}}^G$$

overlap with the reserved resource indicated in the PSCCH, wherein Cresel denotes the number of times that resource is to be reserved after resource reselection of the UE, $P_{rsvp\_TX}$ denotes an assumed resource reservation period for determining available candidate single-subframe resources indicated by higher layer of the UE, the first UE deletes the single-subframe resource $R_{x_g,y}^G$ from the set SG.

In this embodiment, the candidate single-subframe resource exclusion step 2 may be performed as follows.

For a remaining single-subframe resource $R_{x_g,y}^G$ in the set SG, G=0, 1, ..., R−1, the first UE calculates an average value of S-RSSI measured on subchannels x+k' on carrier gi in subframe $t_{y-P*j}^{SL}$ in the channel detection window, wherein j is an integer greater than 0, i=0, 1 ..., M1−1, k'= 0, ..., $L_{subCH}^{gi}$−1, P is a specific value, which may be defined by specifications, configured by the eNB or preconfigured and denotes the S-RSSI average period. For example P=100 or equals to the assumed resource reservation period for determining the available candidate single-subframe resources indicated by higher layer of the UE. The value of the S-RSSI is denoted by $E_{x,y}^G$. The first UE excludes 1−X2% single-subframe resources with highest $E_{x,y}^G$ from the remaining single-subframe resources in the set SG. The value of X2 may be defined by specifications, or configured by the first UE according to information such as eNB configuration, a pre-configuration, a current service type, etc.

At block S1104, the first UE selects one or more single-subframe resources from the remaining single-subframe resources in the set S and transmits the PSSCH on the selected resources.

In this embodiment, the first UE may randomly select one carrier-group single-subframe resource for PSSCH transmission from the remaining carrier-group single-subframe resources of set SG of each of the R carrier groups of the carrier set C, G=0, 1, ... R−1. The manner that the first UE randomly selects the resource from the remaining single-subframe resources of SGshould ensure that each remaining single-subframe resource has the same probability to be selected.

If the UE needs to transmit signals on multiple carriers at a given time, the signals include PSSCH, PSCCH and uplink signals, according to various embodiments of the present disclosure, the UE may adjust the transmit power according to the following sequence.

Step 1, if the value of the priority field of the PSCCH transmitted by the UE on one or more carriers is greater than or equal to thresSL-TxPrioritization, this means that the PSSCH transmitted by the UE on the one or more carriers carries V2X data with a priority lower than thresSL-TxPrioritization, wherein thresSL-TxPrioritization denotes a priority threshold which may be configured by the eNB or preconfigured, the UE may adjust the sidelink transmit power on one or more carriers whose "priority" field has a value greater than or equal to thresSL-TxPrioritization, so as to make the total transmit power of the UE lower than an allowable maximum transmit power PCMAX of the UE.

Step 2, if the values of the "priority" fields of the PSCCH on all current sidelink carriers of the UE are lower than thresSL-TxPrioritization, or the total transmit power is still higher than PCMAX after the UE adjusts the transmit power on all carriers meeting the condition in step 1 to 0, and the UE transmits uplink signals on one or more carriers, the UE may adjust the transmit power of the uplink signals on one or more carriers, so as to make the total transmit power of the UE lower than the allowed maximum transmit power PCMAX of the UE.

Step 3, if the values of the "priority" fields of the PSCCH on all current sidelink carriers of the UE are lower than thresSL-TxPrioritization, and the UE does not transmit uplink signal on any carrier, the UE may adjust the sidelink signal transmit power on the carriers, so as to make the total transmit power of the UE lower than the allowed maximum transmit power PCMAX of the UE.

If the UE needs to transmit signals on multiple carriers at a given time, according to another embodiment of the present disclosure, the UE adjust the transmit power following step 1 of block S1004: the UE determines the priority of the transmit signal on each carrier, adjust the transmit power of one or more carriers used for transmitting data with lowest priority, so as to make the total transmit power of the UE lower than the allowed maximum transmit power PCMAX of the UE. If the total transmit power of the UE is still higher than PCMAX after the power of the above carrier(s) is adjusted to 0, the UE repeats step 1 of block S1004 for the remaining carriers until the total transmit power of the UE becomes lower than the allowed maximum transmit power PCMAX of the UE. The priority of the sidelink signal is determined by the value of the "priority" field in the PSCCH of the sidelink signal. The higher the value of the priority field, the lower the priority level. If there are uplink signals, the priority of the uplink signals is higher than the sidelink signal with priority value thresSL-TxPrioritization, but lower than the sidelink signal with priority value thresSL-TxPrioritization-1, thresSL-TxPrioritization denotes a priority threshold which may be configured by the eNB or preconfigured, thresSL-TxPrioritization-1 denotes thresSL-TxPrioritization minus 1.

If the UE needs to transmit signals on multiple carriers simultaneously, the signals include PSSCH, PSCCH and uplink signals, if the number of carriers on which the UE needs to transmit signals is greater than the number of current available radio transmission chains of the UE, the UE prioritizes the transmission of signals with high priorities and gives up the transmission of signals with low priorities. If the UE needs to transmit signals on two or more carriers at a given time, the signals include PSSCH, PSCCH and uplink signals, and the UE does not support simultaneous transmission on the multiple carriers, the UE prioritizes the transmission of the signals with high priority and gives up the transmission of the signals with low priority. The priority of the sidelink signal is determined by the value of the "priority" field in the PSCCH of the sidelink signal. The higher the value of the priority field, the lower the priority level. If there are uplink signals, the priority of the uplink signals is higher than the sidelink signal with priority value thresSL-TxPrioritization, but lower than the sidelink signal with priority value thresSL-TxPrioritization-1, thresSL-TxPrioritization denotes a priority threshold which may be configured by the eNB or preconfigured, thresSL-TxPrioritization-1 denotes thresSL-TxPrioritization minus 1.

Embodiment 7

In embodiment 7, the carrier set C on which the first UE performs channel detection and resource selection is not configured with carrier group, i.e., the single-subframe resource is single-carrier single-subframe resource. This embodiment includes the following operations.

At block S1201, the first UE determines a carrier set C available for resource selection or reselection.

In this embodiment, the carrier set C includes multiple carriers, the number of carriers in the carrier group C is N. The number and positions of subframes used for SLSS transmission are completely the same on the carriers in the carrier set C. Or, the SLSS transmission subframes may be configured differently on the carriers in the carrier set C, but all of the SLSS transmission subframes on the N1 carriers are not used for configuring the resource pool.

At block S1202, the first UE determines a candidate single-subframe resource set S in the carrier set C.

In this embodiment, it is defined that a single-subframe resource $R_{x,y}^c$ on any carrier c in the carrier set C includes $L_{subCH}^c$ continuous subchannels starting from subchannel x in subframe $t_y^{SL}$, wherein y denotes a relative index of subframe $t_y^{SL}$ in the resource pool, $L_{subCH}^c$ is determined by higher layer (such as MAC layer) of the UE, and denotes the number of subchannels for one PSSCH transmission on carrier c, c=0, 1, . . . , N1−1. If the UE performs resource selection or reselection in subframe n, the UE may determine the $L_{subCH}^c$ continuous subchannels in any subframe belonging to the resource pool and within [n+T1, n+T2] on carrier c as a candidate single-subframe resource, wherein T1 and T2 are subjected to the implementation of the UE. The total number of single-subframe resources on carrier c is noted by $M_{total}^c$, the $M_{total}^c$ candidate single-subframe resources form a set SC. A union of the single-carrier single-subframe resource sets of all carriers in carrier set C is the set S.

At block S1203, the first UE excludes some candidate single-subframe resources from the set S according to a channel detection result.

If the UE performs resource selection in subframe n, the UE may perform detection in subframes within the channel detection window before subframe n on each carrier of the carrier set C, wherein the channel detection window may be defined by specifications, e.g., the channel detection window may include subframes n-1000, n-999, . . . , n-1. For a subframe detected by the first UE, the first UE measures PSCCH-RSPR of the subframe according to a decoded PSCCH, and measures the S-RSSI of the subframe.

In this embodiment, the candidate single-subframe resource exclusion step 1 may include following operations:

If the first UE detects a PSCCH in subframe $t_m^{SL}$ in the channel detection window on carrier c, c=0, 1, . . . , N1−1, and the value of the priority field in the PSCCH is $prio_{RX}$, according to the resource reservation indication, the PSCCH reserves the same frequency resource in subframe $$t_{m+P_{rsvp\_RX}}^{SL},$$

and the value of the PSSCH-RSRP measured on the PSSCH scheduled by the PSCCH is greater than a specific threshold $Th_{prio_{TX},prio_{RX}}^c$; wherein $prio_{TX}$ denotes the value of the priority field in a subsequently transmitted PSCCH indicated by higher layer of the first UE, $Th_{prio_{TX},prio_{RX}}^c$ is configured by the eNB or is preconfigured, denoting a threshold value for the PSSCH-RSRP in the case that the value of the priority field in the subsequently transmitted PSCCH on carrier c indicated by the higher layer of the first UE is $prio_{TX}$, whereas the priority field of the detected PSCCH is $prio_{RX}$. Then:

For any single-carrier single-subframe resource $R_{x,y}^c$ in the subset SC of the set S, if there is a variable j∈{0, 1, . . . , $C_{resel}$−1} which makes the single-subframe resource $$R_{x,y+j\times P_{rsvp\_TX}}^c$$

overlap with reserved resource indicated in the PSCCH, wherein Cresel denotes the number of times that resource is to be reserved after resource reselection of the UE, $P_{rsvp\_TX}$ denotes the assumed resource reservation period for determining the available candidate single-subframe resource indicated by higher layer of the UE, the first UE excludes the single-subframe resource $R_{x,y}^c$ when performing resource selection or reselection, i.e., the first UE deletes the single-subframe resource $R_{x,y}^c$ from the set SC.

In this embodiment, the candidate single-subframe resource exclusion step 2 is performed as follows.

For any remaining single-subframe resource $R_{x,y}^c$ in subset SC of the set S, c=0, 1, . . . , N1−1, the first UE calculates an average value of S-RSSI measured on subchannels x+k' in subframe $t_{y-P*j}^{SL}$ in the channel detection window, wherein j is an integer larger than 0, and k'=0, . . . , $L_{subCH}^c - 1$, P is a predetermined value, it may be defined by specifications, configured by eNB or pre-configured, and denotes S-RSSI average period, e.g., P=100 or an assumed resource reservation period for determining available candidate single-subframe resources indicated by higher layer of the UE; the average value of S-RSSI is noted by $E_{x,y}^c$. The first UE excludes 1-X2% resources with highest $E_{x,y}^c$ from the remaining single-subframe resources in set SC, wherein X2 is a predefined value, it may be defined by specifications, or determined by the first UE according to configuration of the eNB, a pre-configuration or a current service type.

At block S1204, the first UE selects one or more single-subframe resources from the remaining single-subframe resources of the set S, and transmits PSSCH on the selected resources.

In this embodiment, the first UE selects multiple single-subframe resources for PSSCH transmission from the remaining single-subframe resources of set S. The first UE may select the multiple single-subframe resources via any one of the following manners.

Manner 1: the UE randomly selects multiple carriers in the carrier set C with equal probability or selects all carriers of the carrier set C, and randomly selects one single-carrier single-subframe resource from the remaining single-carrier single-subframe resources of each selected carrier with equal probability.

Manner 2: the first UE sorts the carriers in the carrier set C according to their priorities or CBR. Suppose that the carriers are sorted as: carrier 0>carrier 1> . . . >carrier N1−1. Then, the first UE randomly selects one single-carrier single-subframe resource from the remaining single-carrier single-subframe resources of carrier 0. It is assumed that the subframe where the selected single-carrier single-subframe resource is located is subframe t0. Then, if there is remaining single-carrier single-subframe resource in subframe t0 on carrier 1, the first UE randomly selects one single-carrier single-subframe resource from subframe t0. If there is no remaining single-carrier single-subframe resource in subframe t0 on carrier 1, the first UE randomly selects a single-carrier single-subframe resource from the remaining single-carrier single-subframe resources of carrier 1. Suppose that the single-carrier single-subframe resource selected on carrier 1 is t1. Then, the first UE selects single-carrier single-subframe resources on other carriers following the same method.

Manner 3: the first UE selects at most one single-carrier single-subframe resource on each carrier, and the indexes of the subframes where the single-carrier single-subframe resources finally selected by the first UE has a minimum variance, if there are multiple selections with the minimum variance, the first UE may randomly select one of them as the final selection.

Manner 4: the first UE randomly selects X1 single-carrier single-subframe resources with equal probability from the remaining single-carrier single-subframe resources of each subset SC of the set S, and the first UE selects me single-carrier single-subframe resources for PSSCH transmission from the X1 single-carrier single-subframe resources of each SC, wherein c=0, 1, . . . , N1−1, mc=0 or 1, i.e., the UE may select at most one single-carrier single-subframe resource on the carrier or do not select any resource, $$\sum_{c=0}^{N-1} m_c = M;$$

the value of X1 may be directly configured by the eNB or directly preconfigured, or directly defined by specifications, or indirectly configured by the eNB or indirectly preconfigured, or indirectly defined by specifications, e.g., X1=⌈0.1*$R_S$⌉, wherein RS denotes the total number of resources in the set S. The method for selecting the mi single-carrier single-subframe resources from the X1 single-carrier single-subframe resources of carrier Ci may be determined according to the implementation of the UE. In some embodiments, the method that the first UE selects the mi single-carrier single-subframe resources is able to ensure that the radio transmission capability of the first UE can support the PSSCH transmission on the mi single-carrier single-subframe resources. On the premise of this, the method that the first UE selects the mi single-carrier single-subframe resources shall minimize the half-duplex restriction between the single-carrier single-subframe resources.

If the UE needs to transmit signals on multiple carriers at a given time, the signals include PSSCH, PSCCH and uplink signals, according to various embodiments of the present disclosure, the UE may adjust the transmit power according to the following sequence.

Step 1, if the value of the priority field of the PSCCH transmitted by the UE on one or more carriers is greater than or equal to thresSL-TxPrioritization, this means that the PSSCH transmitted by the UE on the one or more carriers carries V2X data with a priority lower than thresSL-TxPrioritization, wherein thresSL-TxPrioritization denotes a priority threshold which may be configured by the eNB or preconfigured, the UE may adjust the sidelink transmit power on one or more carriers whose "priority" field has a value greater than or equal to thresSL-TxPrioritization, so as to make the total transmit power of the UE lower than an allowable maximum transmit power PCMAX of the UE.

Step 2, if the values of the "priority" fields of the PSCCH on all current sidelink carriers of the UE are lower than thresSL-TxPrioritization, or the total transmit power is still higher than PCMAX after the UE adjusts the transmit power on all carriers meeting the condition in step 1 to 0, and the UE transmits uplink signals on one or more carriers, the UE may adjust the transmit power of the uplink signals on one or more carriers, so as to make the total transmit power of the UE lower than the allowed maximum transmit power PCMAX of the UE.

Step 3, if the values of the "priority" fields of the PSCCH on all current sidelink carriers of the UE are lower than thresSL-TxPrioritization, and the UE does not transmit uplink signal on any carrier, the UE may adjust the sidelink signal transmit power on the carriers, so as to make the total transmit power of the UE lower than the allowed maximum transmit power PCMAX of the UE.

If the UE needs to transmit signals on multiple carriers at a given time, according to another embodiment of the present disclosure, the UE adjust the transmit power following step 1 of block 204: the UE determines the priority of the transmit signal on each carrier, adjust the transmit power of one or more carriers used for transmitting data with lowest priority, so as to make the total transmit power of the UE lower than the allowed maximum transmit power PCMAX of the UE. If the total transmit power of the UE is still higher than PCMAX after the power of the above carrier is adjusted to 0, the UE repeats step 1 of block 204 for the remaining carriers until the total transmit power of the UE becomes lower than the allowed maximum transmit power PCMAX of the UE. The priority of the sidelink signal is determined by the value of the "priority" field in the PSCCH of the sidelink signal. The higher the value of the priority field, the lower the priority level. If there are uplink signals, the priority of the uplink signals is higher than the sidelink signal with priority value thresSL-TxPrioritization, but lower than the sidelink signal with priority value thresSL-TxPrioritization-1, thresSL-TxPrioritization denotes a priority threshold which may be configured by the eNB or preconfigured, thresSL-TxPrioritization-1 denotes thresSL-TxPrioritization minus 1.

If the UE needs to transmit signals on multiple carriers at a given time, the signals include PSSCH, PSCCH and uplink signals, if the number of carriers on which the UE needs to transmit signals is greater than the number of current available radio transmission chains of the UE, the UE prioritizes the transmission of signals with high priorities and gives up the transmission of signals with low priorities. If the UE needs to transmit signals on two or more carriers at a given time, the signals include PSSCH, PSCCH and uplink signals, and the UE does not support simultaneous transmission on the multiple carriers, the UE prioritizes the transmission of the signals with high priority, and gives up the transmission of the signals with low priority. The priority of the sidelink signal is determined by the value of the "priority" field in the PSCCH of the sidelink signal. The higher the value of the priority field, the lower the priority level. If there are uplink signals, the priority of the uplink signals is higher than the sidelink signal with priority value thresSL-TxPrioritization, but lower than the sidelink signal with priority value thresSL-TxPrioritization-1, thresSL-TxPrioritization denotes a priority threshold which may be configured by the eNB or preconfigured, thresSL-TxPrioritization-1 denotes thresSL-TxPrioritization minus 1.

Figure 11:
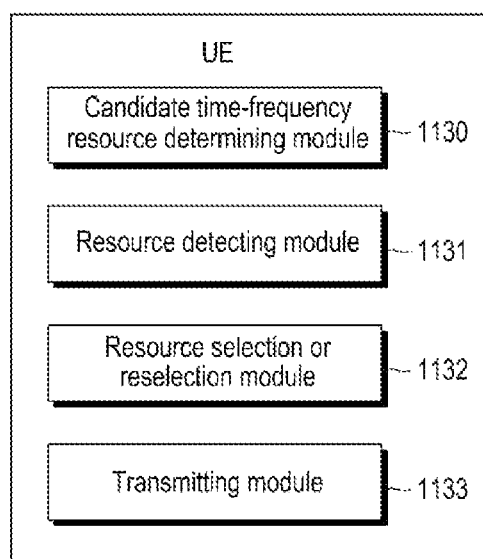
FIG. 11 is a block diagram illustrating a structure of a UE for performing the resource selection or reselection in the V2X communication according to various embodiments of the present disclosure.

FIG. 11 is a block diagram illustrating a UE for executing the resource selection or reselection method in V2X communication according to various embodiments of the present disclosure. As shown in FIG. 11, the UE includes: a candidate time-frequency resource determining module 1130, a resource selection or reselection module 1132, and a transmitting module 1133.

The candidate time-frequency resource determining module is to determine one or more carriers on which the UE performs channel detection, if a carrier group is configured, determine the number of the carrier groups and the number of carriers included in each carrier group; and to determine a candidate single-subframe resource set for each carrier or each carrier group;

the resource selection or reselection module is to select one or more single-subframe resources for data transmission from the candidate single-subframe resource set; and the transmitting module is to transmit a PSSCH on the selected one or more single-subframe resources.

In some embodiments, the UE as shown in FIG. 11 may further include a resource detecting module 1131, to exclude some candidate single-subframe resources from the candidate single-subframe resources according to a PSCCH detected in a channel detection window and an S-RSSI measured in the channel detection window, or exclude some candidate single-subframe resources from the candidate single-subframe resources according another method described in block S1101. In this case, the resource selection or reselection module is to select, after the channel detecting module performs the exclusion operation to the candidate single-subframe resources, one or more single-subframe resources for data transmission from the remaining single-subframe resources.

Those skilled in the art may understand that the present disclosure comprises devices for performing one or more of the operations in the present application. These devices may be specially designed and manufactured for required objectives, or may also comprise known devices in a general-purpose computer. These devices have computer programs stored therein, and these computer programs are selectively activated or reconstructed. Such computer programs may be stored in a device (e.g. computer) readable medium or stored in any type of medium that is suitable for storing an electronic instruction and respectively coupled to a bus. The computer readable medium comprises but is not limited to any type of disk (comprising a floppy disk, hard disk, optical disc, CD-ROM and magnetic optical disc), ROM (Read-Only Memory), RAM (Random Access Memory), EPROM (Erasable Programmable Read-Only Memory), EEPROM (Electrically Erasable Programmable Read-Only Memory), flash memory, magnetic card or light card. That is, the readable medium comprises any medium that a device (e.g. computer) stores or transmits information in a readable form.

Those skilled in the art may understand that computer program instructions may be used to implement each block in these structural diagrams and/or block diagrams and/or flow charts and combinations of blocks of these structural diagrams and/or block diagrams and/or flow charts. Those skilled in the art may understand that these computer program instruction may be provided to a general-purpose computer, a specialized computer or a processor of other programmable data processing methods, so as to perform solutions specified in a block or multiple blocks in structural diagrams and/or block diagrams and/or flow charts disclosed in the present disclosure by a computer or a processor of other programmable data processing methods.

Those skilled in the art may understand that the steps, measures and solutions in various operations, methods and flows which have been discussed in the present disclosure may be alternated, altered, combined or deleted. Furthermore, other steps, measures and solutions in various operations, methods and flows which have been discussed in the present disclosure may also be alternated, altered, rearranged, decomposed, combined or deleted. Furthermore, the steps, measures and solutions in various operations, methods and flows disclosed in the present disclosure in the prior art may also be alternated, altered, rearranged, decomposed, combined or deleted.

What have been described above are merely some implementations of the present disclosure. It should be noted that for those of ordinary skills in the art, several improvements and polishments may also be made without departing from the principle of the present disclosure, and these improvements and polishments should also be deemed as the scope of protection of the present disclosure.

What is claimed is:

1. A method performed by a terminal in a wireless communication system, the method comprising:

receiving, from a base station, configuration information on a transmission resource for a sidelink communication;

performing a channel detection on the transmission resource for the sidelink communication based on a parameter associated with the channel detection; and in case that a result of the channel detection is available, reporting the result of the channel detection to the base station based on configuration information associated with the reporting of the result of the channel detection, wherein the configuration information associated with the reporting of the result of the channel detection includes a reporting period of the result of the channel detection.

2. The method of claim 1, wherein the parameter associated with the channel detection includes at least one of a resource reservation period of the terminal that reserves a sub-channel in the transmission resource or a priority of physical sidelink shared channel (PSSCH) transmitted by the terminal.

3. The method of claim 1, further comprising:
receiving, from the base station, the configuration information associated with the reporting of the result of the channel detection.

4. The method of claim 1, wherein in case that the result of the channel detection is available, reporting the result of the channel detection to the base station based on configuration information associated with the reporting of the result of the channel detection comprises:
reporting the result of the channel detection to the base station based on the reporting period.

5. The method of claim 1, wherein the configuration information associated with the reporting of the result of the channel detection further comprises a subframe offset associated with the reporting of the result of the channel detection.

6. The method of claim 5, wherein in case that the result of the channel detection is available, reporting the result of the channel detection to the base station based on configuration information associated with the reporting of the result of the channel detection comprises:
reporting the result of the channel detection to the base station based on the reporting period and the subframe offset.

7. A terminal in a wireless communication system, the terminal comprising:
a transceiver; and
at least one processor configured to:
receive via the transceiver, from a base station, configuration information on a transmission resource for a sidelink communication,
perform a channel detection on the transmission resource for the sidelink communication based on a parameter associated with the channel detection, and
in case that a result of the channel detection is available, report, via the transceiver, the result of the channel detection to the base station based on configuration information associated with the reporting of the result of the channel detection,
wherein the configuration information associated with the reporting of the result of the channel detection includes a reporting period of the result of the channel detection.

8. The terminal of claim 7, wherein the parameter associated with the channel detection includes at least one of a resource reservation period of the terminal that reserves a sub-channel in the transmission resource or a priority of physical sidelink shared channel (PSSCH) transmitted by the terminal.

9. The terminal of claim 7, wherein the at least one processor is further configured to receive via the transceiver, from the base station, the configuration information associated with the reporting of the result of the channel detection.

10. The terminal of claim 7, wherein the at least one processor is further configured to report via the transceiver the result of the channel detection to the base station based on the reporting period.

11. The terminal of claim 7, wherein the configuration information associated with the reporting of the result of the channel detection further comprises a subframe offset associated with the reporting of the result of the channel detection.

12. The terminal of claim 11, wherein the at least one processor is further configured to report via the transceiver the result of the channel detection to the base station based on the reporting period and the subframe offset.

* * * * *